US012769507B2

(12) United States Patent
Phills

(10) Patent No.: US 12,769,507 B2
(45) Date of Patent: Oct. 20, 2026

(54) SYSTEM AND METHOD FOR ENHANCING AND AUGMENTING PRESENTATION ACCESSIBILITY THROUGH REAL TIME AUDIO AND TEXT NARRATION

(71) Applicant: Anthony Phills, Los Angeles, CA (US)

(72) Inventor: Anthony Phills, Los Angeles, CA (US)

( * ) Notice: Subject to any disclaimer, the term of this patent is extended or adjusted under 35 U.S.C. 154(b) by 244 days.

(21) Appl. No.: 18/797,751

(22) Filed: Aug. 8, 2024

(65) Prior Publication Data

US 2025/0077171 A1 Mar. 6, 2025

Related U.S. Application Data

(60) Provisional application No. 63/535,664, filed on Aug. 31, 2023.

(51) Int. Cl.
*G06F 3/16* (2006.01)
*G10L 13/00* (2006.01)

(52) U.S. Cl.
CPC .............. *G06F 3/165* (2013.01); *G06F 3/167* (2013.01); *G10L 13/00* (2013.01)

(58) Field of Classification Search
CPC .. G06F 3/167; G06F 3/165; G06F 2203/0381; G06F 3/0481; G06F 16/4393; G06F 3/0483; G10L 13/00
See application file for complete search history.

(56) References Cited

U.S. PATENT DOCUMENTS

| | | | | |
|---|---|---|---|---|
| 11,289,091 | B2 * | 3/2022 | Srivastava | H04N 23/69 |
| 12,190,018 | B2 * | 1/2025 | Bala | G06F 16/685 |
| 12,432,309 | B2 * | 9/2025 | Agarwal | G10L 15/26 |
| 2009/0210796 | A1 * | 8/2009 | Bhogal | G06F 16/4393 715/730 |
| 2018/0060028 | A1 * | 3/2018 | Carr | G10L 15/08 |
| 2019/0138579 | A1 * | 5/2019 | Ali | G06F 16/4393 |
| 2020/0105251 | A1 * | 4/2020 | Meshram | G06F 16/3331 |

* cited by examiner

*Primary Examiner* — Joseph Saunders, Jr.

(57) ABSTRACT

Exemplary embodiments of the present disclosure are directed towards system for enhancing presentation accessibility through real-time audio and text narration. The system comprises computing and/or communication device with display unit for showing presentation content and processor executing instructions from real-time audio and text narration engine. The engine includes presenter-side script and control module that enables presenter to initiate and control slide transitions. Utilizing natural language processing algorithms, the engine listens to presenter's speech to detect cues and markers, triggering dynamic responses for changing slides and delivering images, audio playback, and text descriptions in real-time. Features include intro-sound indicator, AI voice reading, and special audio effects. Server, communicatively coupled via network, includes receiver module for receiving presentation content and processing module for generating real-time narration. The adaptive real-time response module monitors presentation content, user interactions, and feedback, making real-time adjustments to enhance accessibility for users, including visually impaired members.

33 Claims, 19 Drawing Sheets

2200

2300

SYSTEM AND METHOD FOR ENHANCING AND AUGMENTING PRESENTATION ACCESSIBILITY THROUGH REAL TIME AUDIO AND TEXT NARRATION

CROSS-REFERENCE TO RELATED APPLICATIONS

This patent application claims priority benefit of U.S. Provisional Patent Application No. 63/535,664, entitled "SYSTEM AND METHOD FOR ENHANCING AND AUGMENTING PRESENTATION ACCESSIBILITY THROUGH REAL TIME AUDIO AND TEXT NARRATION", filed on 31 Aug. 2023. The entire contents of the patent application are hereby incorporated by reference herein in its entirety.

COPYRIGHT AND TRADEMARK NOTICE

This application includes material which is subject or may be subject to copyright and/or trademark protection. The copyright and trademark owner(s) has no objection to the facsimile reproduction by any of the patent disclosure, as it appears in the Patent and Trademark Office files or records, but otherwise reserves all copyright and trademark rights whatsoever.

TECHNICAL FIELD

The disclosed subject matter relates generally to a system and method for enhancing and augmenting the accessibility of multimedia presentations. More particularly, the present disclosure relates to a system and method for providing real-time audio and text narration to augment the accessibility of slide presentations for visually impaired users.

BACKGROUND

Multimedia presentations, ranging from slide shows to video and interactive content, serve as a crucial form of information dissemination in fields such as education, business, and entertainment. While these presentations offer a compelling medium for conveying complex ideas, they pose significant accessibility challenges for individuals with visual impairments.

Current solutions aimed at enhancing accessibility, like embedded descriptive text or manual narration, fall short in providing a real-time, adaptive experience. Automated methods, such as screen readers or text-to-speech engines, often lack full integration with multimedia presentation platforms, thereby offering a limited and disjointed user experience. These methods are generally not adaptable to real-time changes in the content or the behavior of the presenter and typically require pre-configured setups that may not be easily transferable across different platforms or types of multimedia content.

In addition, existing systems usually offer limited personalization options such as language preferences, narration speed, and volume control. These constraints hinder visually impaired individuals from fully engaging with the multimedia content being presented. The situation is further exacerbated by the lack of real-time user feedback mechanisms and supplementary features like special audio effects, which could otherwise enhance comprehension and user experience.

In the light of the aforementioned discussion, there exists a need for a system and method capable of providing real-time, context-rich audio and text narration for multimedia presentations. Such a system would be fully integrated with a range of multimedia platforms, adaptable to real-time changes, and customizable to individual user preferences, thereby significantly enhancing accessibility.

SUMMARY

The following invention presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

An objective of the present disclosure is directed towards a system and method for enhancing and augmenting presentation accessibility through real time audio and text narration.

Another objective of the present disclosure is directed towards a comprehensive solution for enhancing and augmenting the accessibility of multimedia presentations for visually impaired individuals through real-time audio and text narration.

Another objective of the present disclosure is directed towards a system that can adapt in real-time to changes in multimedia content or presenter behavior, thereby ensuring that the provided audio and text narrations are contextually appropriate and up-to-date.

Yet another objective of the present disclosure is directed towards a system that is fully integrated with a variety of multimedia platforms, ranging from slide presentation software to video and interactive content providers, ensuring a seamless user experience across diverse forms of media.

A further objective of the present disclosure is directed towards providing a highly customizable user experience, including but not limited to preferences for language, narration speed, and volume, thereby addressing the individual needs of each user.

An additional objective of the present disclosure is directed towards incorporating real-time user feedback mechanisms and supplementary features like special audio effects to further enhance the comprehension and overall user experience for visually impaired individuals.

According to an exemplary aspect of the present disclosure includes a system and method for enhancing and augmenting presentation accessibility through real time audio and text narration.

According to another exemplary aspect of the present disclosure includes a Real-Time Audio and Text Narration Engine that processes multimedia content to generate contextual audio and text narrations. The engine utilizes advanced artificial intelligence modules to interpret multimedia content and produce narrations that are then delivered to users' devices in real-time.

According to another exemplary aspect of the present disclosure is directed towards full integration with various multimedia platforms. Through Application programming interface (APIs) or embedded bots, the system is designed to be compatible with slide presentation module, video streaming services, and interactive content providers. This ensures seamless narration delivery across multiple types of multimedia content.

According to another exemplary aspect of the present disclosure is directed towards an Adaptive Real-Time Response feature, which tracks changes in the multimedia presentation or presenter's behavior. This feature uses real-time analytics to adapt the narration dynamically, ensuring that the content is always contextually appropriate and up-to-date.

According to another exemplary aspect of the present disclosure is directed towards Customizable User Settings that allow users to personalize their experience by selecting their preferred language, narration speed, and volume. These settings can be adjusted on-the-fly, providing a tailored experience for each individual user.

According to another exemplary aspect of the present disclosure is directed towards a Real-Time Feedback Mechanism that allows users to rate the quality of narrations and the show, as well as any supplementary features like special audio effects. This feedback is processed in real-time to further enhance the system's performance and user experience.

According to another exemplary aspect of the present disclosure is directed towards a Presenter-Side Script and Control System that interacts with the presentation module. It enables the presenter to control the timing and type of narrations sent out, offering yet another layer of customization and adaptability.

According to another exemplary aspect of the present disclosure is directed towards an AI-Generated Slide Summary and Description feature, where the AI engine scans through the multimedia content and generates concise summaries or descriptions, which are then converted into audio or text narrations.

According to another exemplary aspect of the present disclosure is directed towards an integration with Voiceover and Special Effect Audio. In this setup, text descriptions can be read out by a voiceover function while special effect audio plays in the background, enhancing the sensory experience for the user.

According to another exemplary aspect of the present disclosure, a computing and/or communication device comprises a display unit for showing a presentation content, and a processor for executing instructions from a real-time audio and text narration engine located within the computing and/or communication device.

According to another exemplary aspect of the present disclosure, the real-time audio and text narration engine comprises a presenter-side script and control module configured to enable a presenter to initiate a presentation and control slide transitions, whereby the real-time audio and text narration engine actively listens to the presenter's speech to detect specific cues and markers embedded within the presentation content using natural language processing algorithms.

According to another exemplary aspect of the present disclosure, the real-time audio and text narration engine initiates dynamic responses for changing slides, and selects and delivers appropriate images, audio playback, and text file descriptions in real-time, generating audio playback with an into-sound indicator, an AI voice reading description, and sound effects related to a slide, generating text file descriptions with a voiceover accessibility feature and special effect audio playing simultaneously to enhance user experience, presenting selected images on a user interface of the computing and/or communication device, and transmitting audio playback and text file descriptions to the computing and/or communication device to enhance accessibility for users, including visually impaired members.

According to another exemplary aspect of the present disclosure, a server communicatively coupled to the computing and/or communication device via the network, wherein the server comprises a receiver module configured to receive the presentation content from the computing and/or communication device.

According to another exemplary aspect of the present disclosure, a processing module configured to generate real-time audio and text narration from the presentation content.

According to another exemplary aspect of the present disclosure, the processing module comprising an adaptive real-time response module configured to monitor the presenter's presentation content for cues and markers by tracking the slides being displayed, the adaptive real-time response module further configured to monitor users' interactions and feedback, analyze the context of the presentation, and assess the importance of slides and the presenter's mood, whereby the adaptive real-time response module makes real-time adjustments, alters the speed of the narration, modifies the sequence of slides, and integrates feedback, thereby providing synchronized real-time audio and text narration that enhances presentation accessibility for users.

BRIEF DESCRIPTION OF THE DRAWINGS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
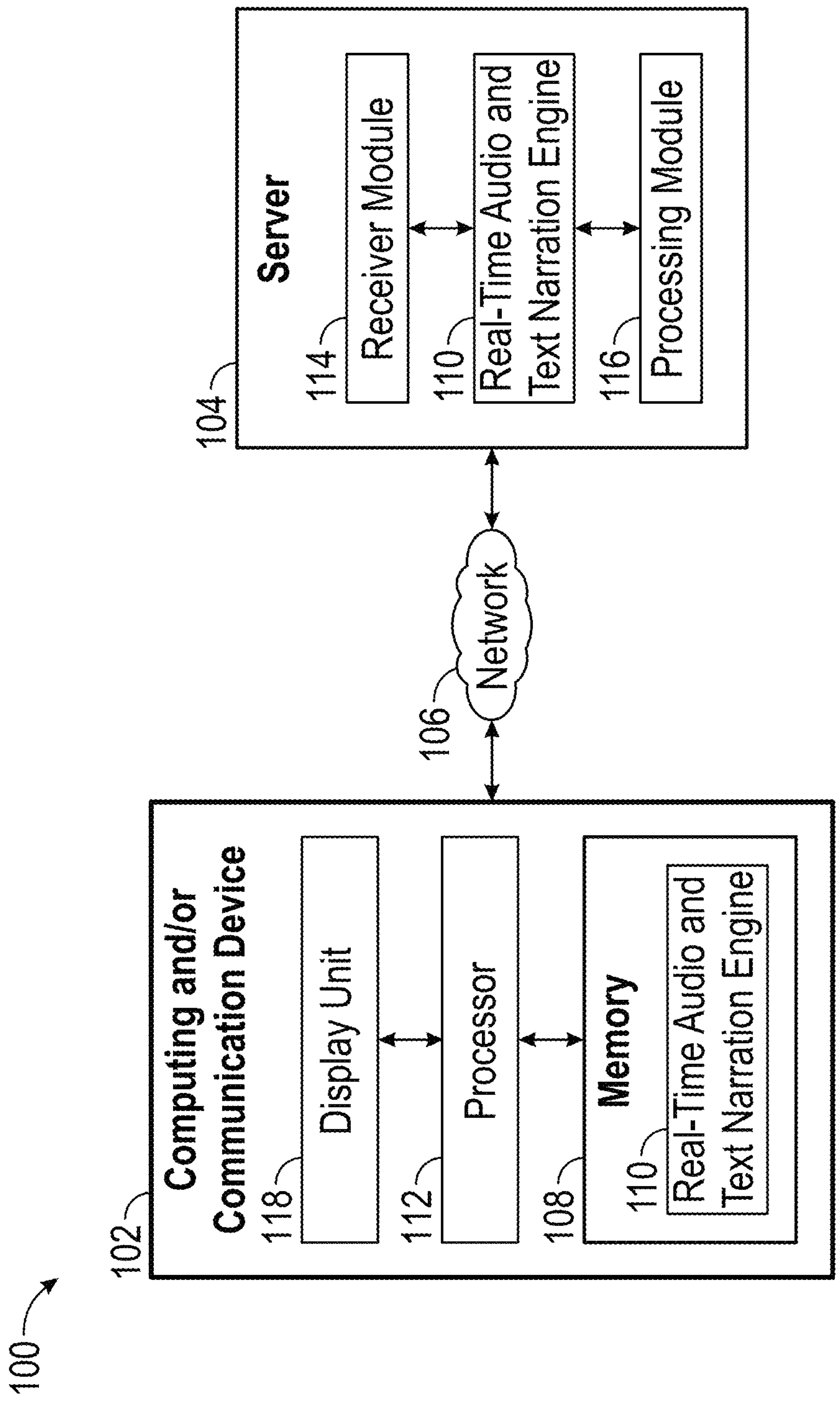
FIG. 1 is a block diagram that provides a schematic representation of an exemplary system designed to enhance presentation accessibility through real-time audio and text narration.

Furthermore, the objects and advantages of this invention will become apparent from the following description and the accompanying annexed drawings.

DETAILED DESCRIPTION OF EXAMPLE EMBODIMENTS

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Further, the use of terms "first", "second", and "third", and so forth, herein do not denote any order, quantity, or importance, but rather are used to distinguish one element from another.

Referring to FIG. 1, the block diagram 100 may provide a schematic representation of an exemplary system designed to potentially enhance presentation accessibility through real-time audio and text narration. The overall image 100 may include several key components that may interact to accomplish the system's objectives. Element 102 may represent a computing and/or communication device, which could be a desktop, laptop, tablet, or mobile device. This computing and/or communication device may serve as the client-side interface where users, including both the presenter and individuals with visual impairments, may interact with the system. Element 104 may denote a server, which may host the core functionalities of the system. This server 104 may be responsible for generating real-time audio and text narration based on the slides or multimedia content provided by the presenter. This server 104 may also handle processing user inputs and settings, among other administrative tasks.

Element 106 may symbolize the network through which the computing and/or communication device 102 and server 104 may communicate. This network 106 could be the internet for online presentations, or a local area network (LAN) for onsite presentations. Element 108 may represent memory, which could be either server-side storage or client-side storage. This memory 108 may store the audio and text files generated for each slide or piece of multimedia content, along with other data like user settings and preferences.

Element 110 may be the Real-Time Audio and Text Narration Engine, which may serve as the core functionality of the system. This engine may be responsible for the actual generation of audio and text descriptions based on the slides and user inputs. It may reside within both the server 104 and the client-side computing and/or communication device 102, potentially enabling real-time communication and adaptation based on user feedback. The block diagram 100 may offer a high-level overview of how the different components of the system may interact to deliver real-time audio and text narration, thereby potentially enhancing the accessibility of presentations or multimedia content for visually impaired individuals.

Element 102 represents a computing and/or communication device, which can be a desktop, laptop, tablet, or mobile device. This computing and/or communication device 102 may serve as the client-side interface where users, including both the presenter and individuals with visual impairments, interact with the system. The computing and/or communication device 102 includes: A display unit 118, which is responsible for showing the presentation content. A processor 112, which executes instructions from the real-time audio and text narration engine 110. Memory 108, which stores the real-time audio and text narration engine 110. The real-time audio and text narration engine 110 comprises several functional modules, including a presenter-side script and control module, special purpose audio effects module, customizable user settings module, real-time feedback module, and user interface module, all working together to facilitate the presentation. Element 104 represents the server, which hosts the core functionalities of the system. The server 104 is responsible for generating real-time audio and text narration based on the slides or multimedia content provided by the presenter. The server 104 handles processing user inputs and settings, among other administrative tasks. The server 104 includes: A receiver module 114, which is configured to receive the presentation content from the computing and/or communication device 102 via the network 106. The real-time audio and text narration engine 110, which is responsible for generating the audio and text narration. A processing module 116, which processes the presentation content to generate real-time audio and text narration. The processing module 116 comprises an adaptive real-time response module that monitors the presenter's presentation content for cues and markers, tracks the slides being displayed, and analyzes user interactions and feedback. This module makes real-time adjustments, alters the speed of the narration, modifies the sequence of slides, and integrates feedback, thereby providing synchronized real-time audio and text narration that enhances presentation accessibility for users. The network 106 facilitates communication between the computing and/or communication device 102 and the server 104. This network 106 may be the internet for online presentations or a local area network (LAN) for onsite presentations. In summary, the block diagram 100 offers a high-level overview of how the different components of the system interact to deliver real-time audio and text narration, thereby potentially enhancing the accessibility of presentations or multimedia content for visually impaired individuals.

Figure 2:
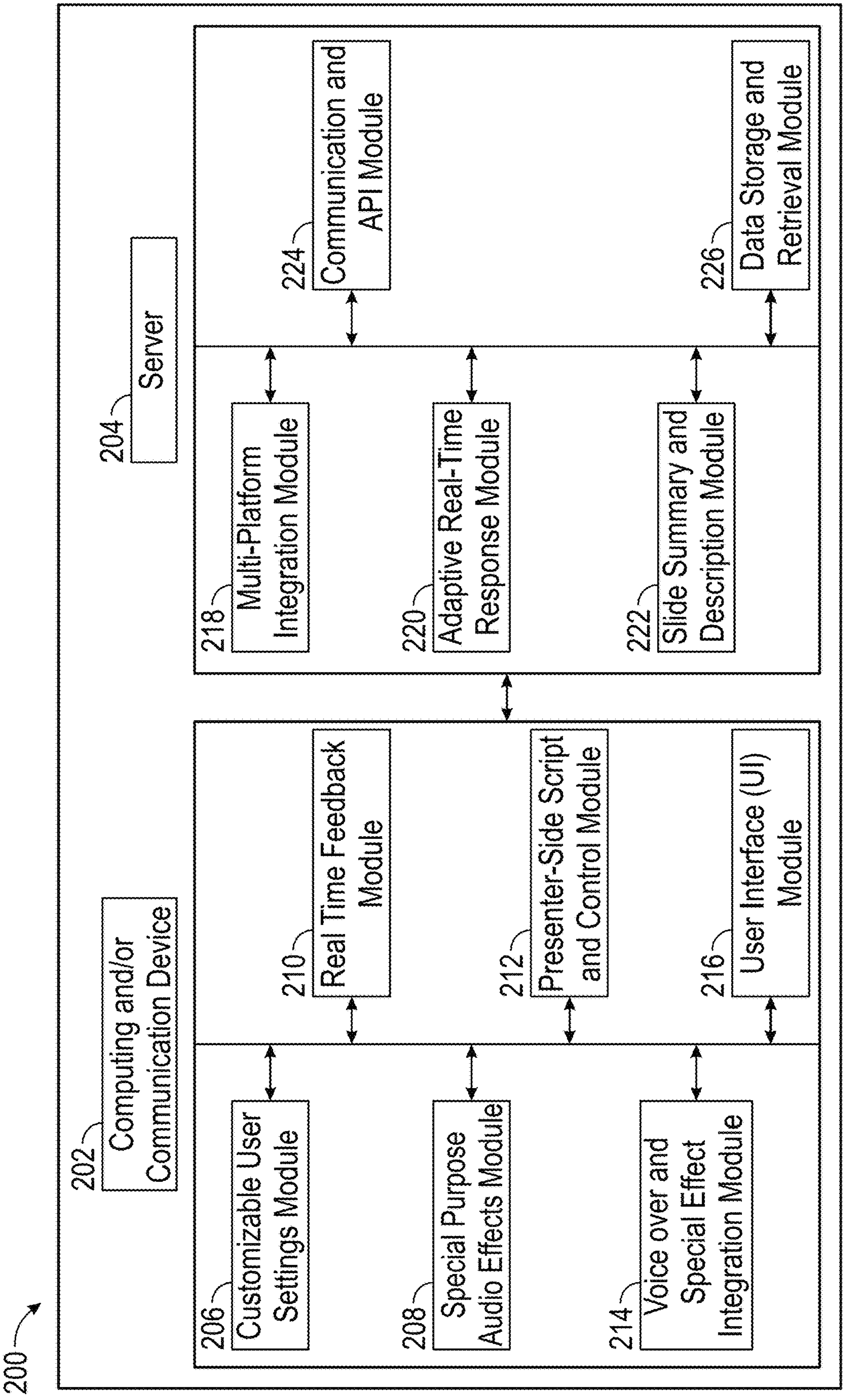
FIG. 2 is a block diagram depicting the server-side and client-side functional modules that comprise the Real-Time Audio and Text Narration Engine, as shown in FIG. 1, in greater detail.

Referring to FIG. 2, the block diagram 200 may depict the server-side and client-side functional modules that comprise the Real-Time Audio and Text Narration Engine, as shown in FIG. 1, in greater detail. The overall image 200 may encompass an ensemble of modules and components that may work in tandem to enhance the accessibility of presentations through real-time audio and text narration.

Element 202 may represent the client-side computing and/or communication device, which may include various functional modules designed to improve user interaction and experience. This computing and/or communication device may be the same as element 102 in FIG. 1 and may host modules such as 206: Customizable User Settings Module, 208: Special Purpose Audio Effects Module, 210: Real-Time Feedback Module, 212: Presenter-Side Script and Control Module, 214: Voiceover and Special Effect Integration Module, and 216: User Interface (UI) Module.

Element 204 may denote the server, which may also include a set of functional modules aimed at executing core functionalities and administrative tasks. This server 204 may correspond to element 104 in FIG. 1 and may house modules like 218: Multi-Platform Integration Module, 220: Adaptive Real-Time Response Module, 222: Slide Summary and Description Module, 224: Communication and API Module, and 226: Data Storage and Retrieval Module.

Module 206, or the Customizable User Settings Module, may allow users to personalize various aspects of the presentation, such as the speed of the narration, the volume of the audio, and the display settings. Module 208, known as the Special Purpose Audio Effects Module, may introduce ambient sounds or special audio effects to enhance the narration. Module 210, termed as the Real-Time Feedback Module, may capture user feedback in real time to adapt the presentation's audio and text narration accordingly. Module 212, the Presenter-Side Script and Control Module, may enable the presenter to control the flow of the presentation, including slides and associated narrations. Module 214, called the Voiceover and Special Effect Integration Module, may handle the integration of voiceovers and special effects into the presentation. Module 216, the User Interface (UI) Module, may be responsible for the design and interaction of the system's interface from the client side.

Modules 218 through 226 may be primarily located on the server side, with Module 218, the Multi-Platform Integration Module, enabling compatibility with various presentation software platforms; Module 220, the Adaptive Real-Time Response Module, automatically adapting the system's output based on real-time conditions; Module 222, the Slide Summary and Description Module, generating brief summaries and detailed descriptions of each slide; Module 224, the Communication and API Module, managing the data exchange between the server and client; and Module 226, the Data Storage and Retrieval Module, storing and retrieving presentation data.

Figure 3:
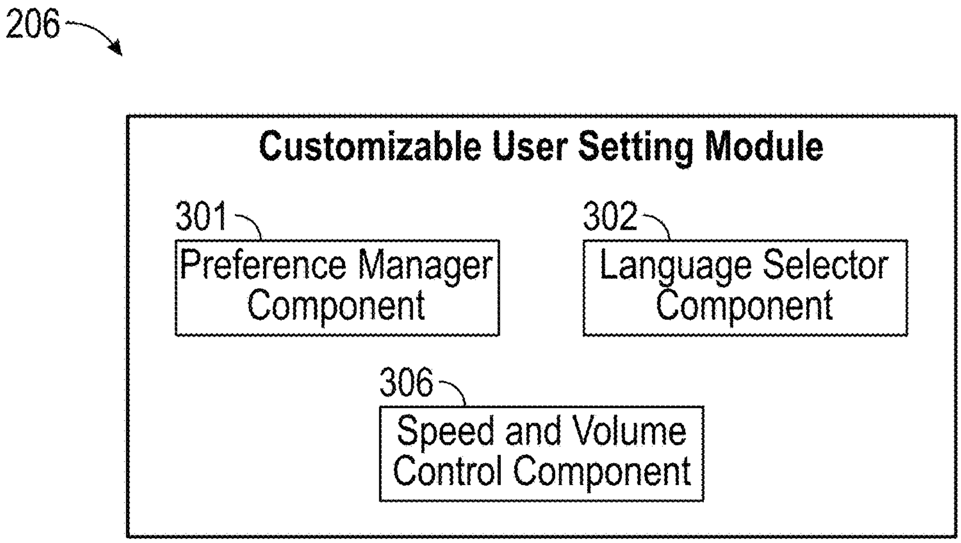
FIG. 3 is a block diagram depicting the internal functional components of the Customizable User Settings Module 206, as referenced in FIG. 2.

Referring to FIG. 3, the block diagram may depict the internal functional components of the Customizable User Settings Module 206, as referenced in FIG. 2. The overall image 206 may provide a closer look into the various components that may work in concert to allow users to customize settings tailored to their specific needs and preferences.

Component 301, termed as the Preference Manager Component, may be the central hub for managing all user-specific settings. It may interface with other components within this module to store and retrieve user preferences, such as language, narration speed, and volume levels. Component 302, known as the Language Selector Component, may enable users to choose the language in which they wish to receive the audio and text narration. This may be especially useful in multi-lingual settings or for users who are more comfortable with a language other than the default. Component 306, called the Speed and Volume Control Component, may allow users to adjust the speed of the audio narration as well as the volume. Users may customize these settings to match their listening capabilities or to suit the ambient noise conditions. Together, these components may form the Customizable User Settings Module 206, which may be designed to enhance user experience by providing a flexible and personalized interface.

Figure 4A:
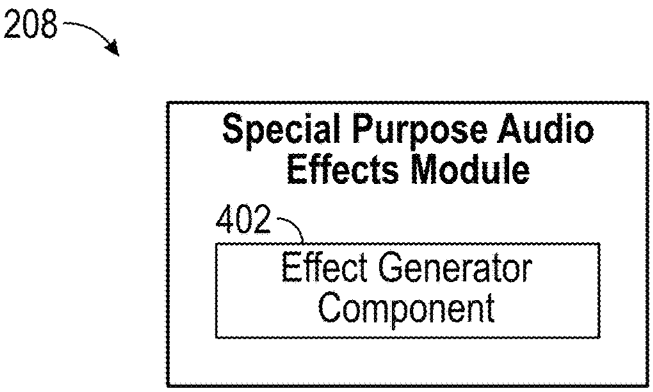
FIG. 4A is a block diagram illustrating the internal functional components of the Special Purpose Audio Effects Module 208, as introduced in FIG. 2.

Referring to FIG. 4A is a block diagram illustrating the internal functional components of the Special Purpose Audio Effects Module 208, as introduced in FIG. 2. The overall image 208 provides a schematic representation of the module designed to add special audio effects to the narration, thereby enhancing the presentation experience for the users.

The Effect Generator Component 402 may be the primary element within the Special Purpose Audio Effects Module 208. It may be responsible for generating various special audio effects, such as echoes, reverberation, pitch modulation, and other sound manipulations. This component may interact with the Real-Time Audio and Text Narration Engine to integrate these effects into the live or pre-recorded narration, depending on user settings or preset conditions. In summary, the Special Purpose Audio Effects Module 208, primarily through its Effect Generator Component 402, may add an additional layer of engagement and interest to the audio component of the presentation.

Figure 4B:
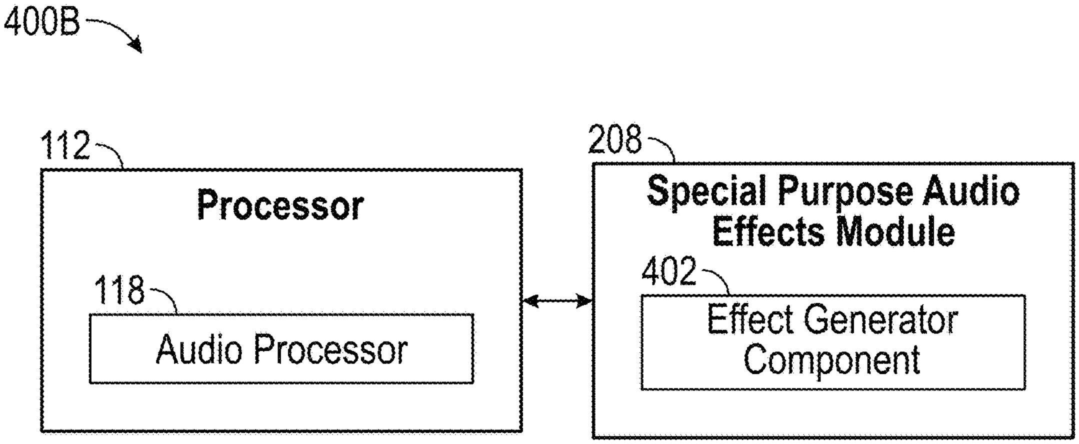
FIG. 4B is a block diagram illustrating the interaction between the processor 112 and the Special Purpose Audio Effects Module 208.

Referring to FIG. 4B, the block diagram 400B illustrates the interaction between the processor 112 and the Special Purpose Audio Effects Module 208 within the real-time audio and text narration engine. The processor 112 comprises an audio processor 118. The audio processor 118 is responsible for executing instructions from the real-time audio and text narration engine related to audio processing tasks. The Special Purpose Audio Effects Module 208 may be configured to enhance the presentation narration with various audio effects. Within this module, there is an effect generator component 402, which is tasked with generating special audio effects. The interaction between the processor 112 and the special purpose audio effects module 208 may be bidirectional. The audio processor 118 sends and receives data to and from the effect generator component 402. This allows for the seamless integration and synchronization of audio effects with the presentation content. The effect generator component 402 in the special purpose audio effects module 208 may create a variety of special audio effects, including but not limited to echoes, reverberation, pitch modulation, and other sound manipulations. These effects are generated using an audio processor 118 and a sound library stored in the computing and/or communication device 102. The generated audio effects enhance the overall narration experience, making the presentation more engaging and accessible, particularly for visually impaired users. In summary, FIG. 4B illustrates how the processor 112, through its audio processor 118, interacts with the special purpose audio effects module 208 and its effect generator component 402 to generate and integrate special audio effects into the real-time narration, thereby enhancing the presentation's accessibility and user experience.

Figure 5:
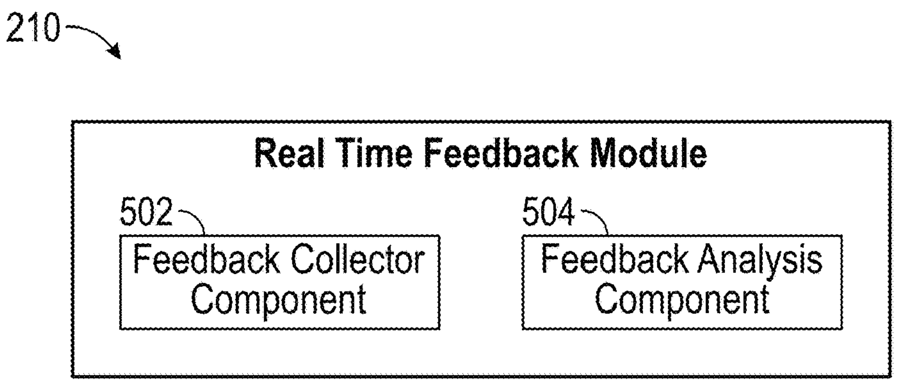
FIG. 5 is a block diagram showcasing the internal functional elements of the Real-Time Feedback Module 210, as outlined in FIG. 2.

Referring to FIG. 5 is a block diagram showcasing the internal functional elements of the Real-Time Feedback Module 210, as outlined in FIG. 2. The Overall Image 210 provides a visual representation of this module, which is designed to collect and analyze user feedback in real-time to enhance the quality of the presentation.

The Feedback Collector Component 502 may be tasked with gathering user feedback in various forms, such as likes, dislikes, comments, or other user interactions during the presentation. This feedback may be collected from multiple sources, including in-app user inputs, voice commands, or other third-party integrations. The Feedback Analysis Component 504 may work in conjunction with the Feedback Collector Component 502 to analyze the collected data. The analysis may include sentiment analysis, frequency counts, or other relevant metrics that help in understanding the effectiveness of the presentation or narration. The results of this analysis may then be utilized to make real-time adjustments to the presentation or for future reference. In summary, the Real-Time Feedback Module 210, primarily consisting of the Feedback Collector Component 502 and Feedback Analysis Component 504, may offer a comprehensive system for enhancing user experience by gathering and interpreting user feedback in real-time.

Figure 6:
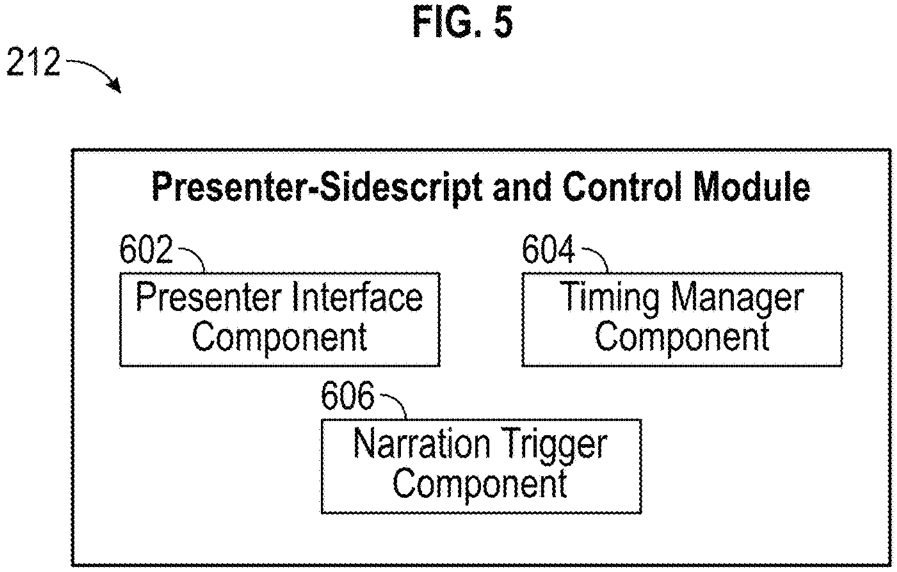
FIG. 6 is a block diagram revealing the internal functional components that constitute the Presenter-Side Script and Control Module 212, as detailed in FIG. 2.

Referring to FIG. 6, the block diagram reveals the internal functional components that constitute the Presenter-Side Script and Control Module 212, as detailed in FIG. 2. The Overall Image 212 provides a comprehensive view of this specific module, designed to offer enhanced control and scripting functionalities to the presenter during the presentation.

The Presenter Interface Component 602 may serve as the primary interaction point for the presenter, enabling them to manage various aspects of the presentation. This could include slide navigation, activation of specific narration or audio effects, and other customizable controls that the presenter may need during the presentation. The Timing Manager Component 604 may be responsible for coordinating the timing aspects of the presentation. This could include synchronizing the audio and text narration with the slide transitions, providing countdowns, or triggering specific actions based on pre-set times or conditions. The Narration Trigger Component 606 may function to initiate the real-time audio and text narration. It may operate based on cues from the Timing Manager Component 604 or direct input from the Presenter Interface Component 602. This component may also interact with other system modules to ensure that the narration is consistent with the presentation's current state and user settings. In summary, the Presenter-Side Script and Control Module 212, featuring the Presenter Interface Component 602, Timing Manager Component 604, and Narration Trigger Component 606, may offer an advanced toolset to presenters for optimizing the flow and interactivity of their presentations.

Figure 7:
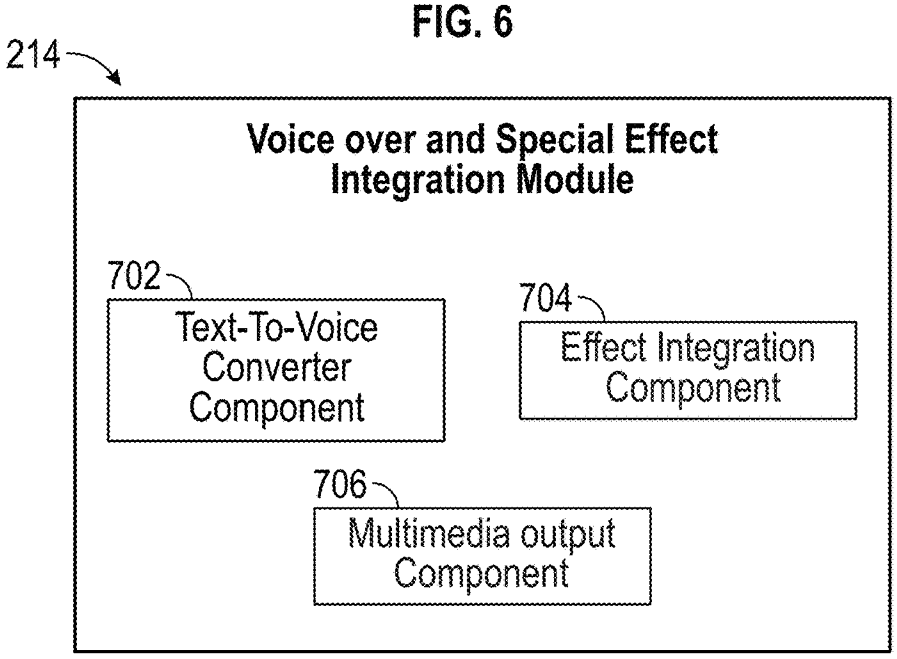
FIG. 7 is a block diagram that presents the internal functional components of the Voiceover and Special Effect Integration Module 214, as derived from FIG. 2.

Referring to FIG. 7, the block diagram presents the internal functional components of the Voiceover and Special Effect Integration Module 214, as derived from FIG. 2. The Overall Image 214 provides an overview of this specific module, designed to facilitate the seamless integration of voiceover narrations and special audio effects within the presentation.

The Text-to-Voice Converter Component 702 may serve as the main element responsible for converting written text into spoken words. It may take input from the Presenter-Side Script and Control Module 212 or directly from pre-written scripts and convert it into real-time audio narration, which can be included in the presentation. The Effect Integration Component 704 may be tasked with incorporating various special audio effects into the presentation. These could range from background music to specific sound effects that may enhance the overall presentation experience. The Effect Integration Component 704 may synchronize these effects with the audio narration or other media, as directed by other system modules or user settings. The Multimedia Output Component 706 may serve as the final stage for the assembled audio stream. It may combine the audio narration generated by the Text-to-Voice Converter Component 702 and any special audio effects integrated by the Effect Integration Component 704. The Multimedia Output Component 706 may then output this complete audio package to the presentation system or directly to the audience's devices. In summary, the Voiceover and Special Effect Integration Module 214, featuring the Text-to-Voice Converter Component 702, Effect Integration Component 704, and Multimedia Output Component 706, may offer a comprehensive solution for enriching presentations with advanced audio capabilities.

Figure 8:
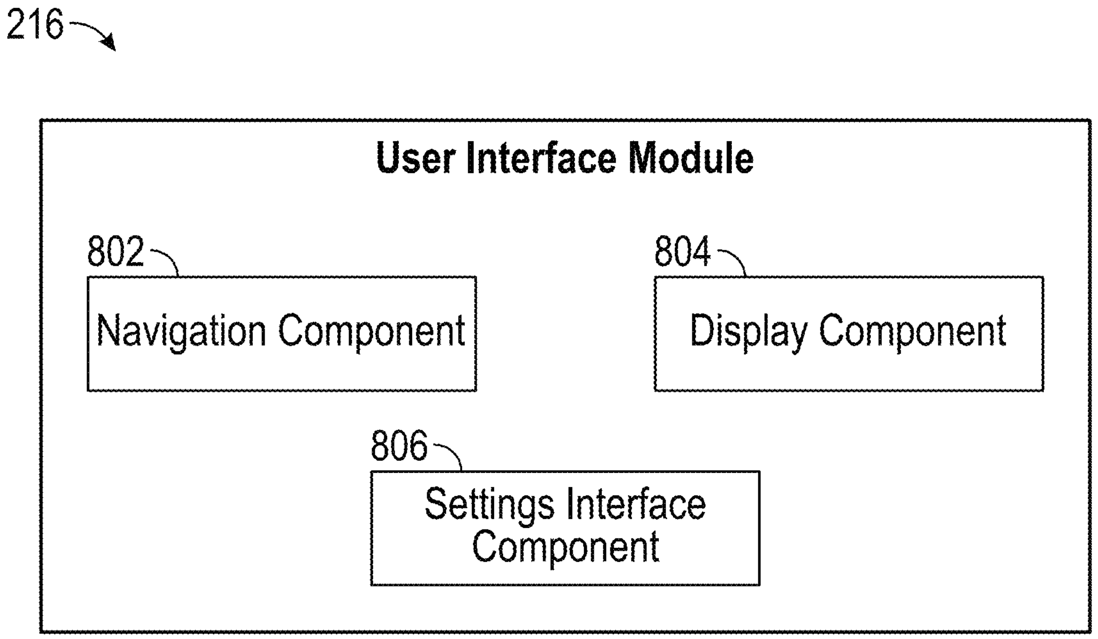
FIG. 8 is a block diagram delineating the internal functional components of the User Interface (UI) Module 216, as featured in FIG. 2.

Referring to FIG. 8, the block diagram delineates the internal functional components of the User Interface (UI) Module 216, as featured in FIG. 2. The Overall Image 216 provides an overarching view of this module, which is designed to create an interactive and intuitive interface for the user.

The Navigation Component 802 may be responsible for enabling the users to navigate through the various functionalities and settings available in the system. This could include moving from one section or feature to another, accessing additional information, or interacting with the presentation in real-time. The Display Component 804 may manage the visualization of the presentation as well as other pertinent information and settings. It may include a graphical user interface (GUI) designed to make it easy for both presenters and audience members to view and understand the presentation content, audio narrations, and associated features. The Settings Interface Component 806 may allow users to customize various aspects of the system to their preference. This could include altering audio settings, changing the language, and adjusting the display among other options. The Settings Interface Component 806 may interact closely with the Customizable User Settings Module 206 to provide a personalized experience for each user. In summary, the User Interface (UI) Module 216, equipped with the Navigation Component 802, Display Component 804, and Settings Interface Component 806, may serve as the front-end of the system, offering an intuitive and customizable experience for both presenters and audience members.

Figure 9:
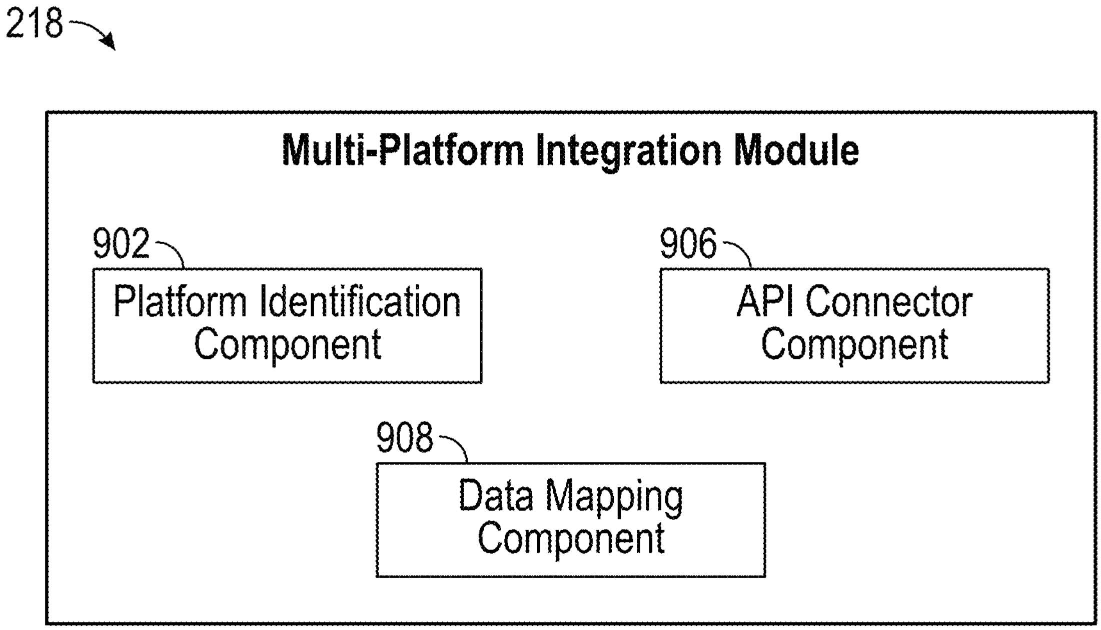
FIG. 9 is a block diagram displaying the internal functional components of the Multi-Platform Integration Module 218, as specified in FIG. 2.

Referring to FIG. 9, the block diagram displays the internal functional components of the Multi-Platform Integration Module 218, as specified in FIG. 2. The Overall Image 218 serves as a comprehensive representation of this module, which is configured to ensure seamless integration across multiple platforms.

The Platform Identification Component 902 may be responsible for identifying the various platforms with which the system can interact. This could include different types of presentation software, third-party applications, or even various operating systems. This component may also handle compatibility checks and ensure that the system can operate efficiently across these platforms. The API Connector Component 906 may handle the interaction between the Multi-Platform Integration Module 218 and other systems through the use of Application Programming Interfaces (APIs). This can include transmitting data, sending commands, or receiving information from third-party platforms or services. The Data Mapping Component 908 may be designed to map the data and functionalities from the system onto the platform it is integrated with. This could involve converting the system's data formats to those that can be understood by third-party platforms, or vice versa, and ensuring that functionalities in one system translate effectively into another. In summary, the Multi-Platform Integration Module 218 may serve as the conduit for ensuring that the system is compatible and can function seamlessly across various platforms. It achieves this through the Platform Identification Component 902, API Connector Component 906, and Data Mapping Component 908.

Figure 10:
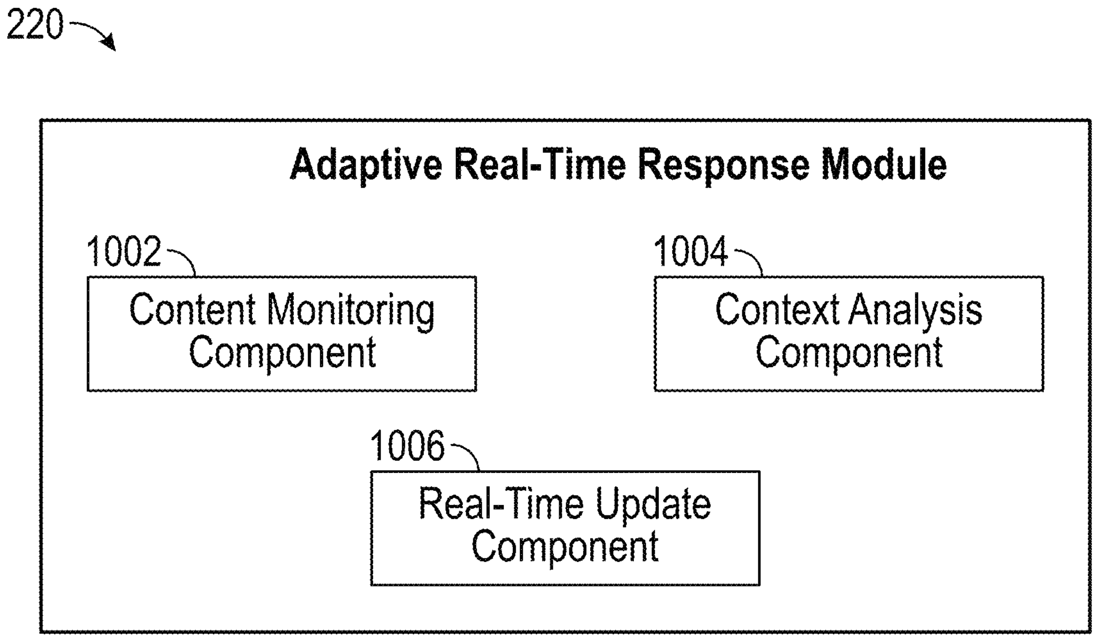
FIG. 10 is a block diagram detailing the internal functional components of the Adaptive Real-Time Response Module 220, as connected to FIG. 2.

Referring to FIG. 10, the block diagram details the internal functional components of the Adaptive Real-Time Response Module 220, as connected to FIG. 2. The Overall Image 220 encapsulates the various sub-components that collectively enable the module to adapt responses in real-time during a presentation.

The Content Monitoring Component 1002 may be configured to continuously observe the presentation content in real-time. This could include tracking the slides being displayed, the pace of the presentation, as well as any audio or text narratives that are part of it. It may also monitor user interactions and feedback to help adapt the presentation accordingly. The Context Analysis Component 1004 may work in tandem with the Content Monitoring Component 1002 to analyze the context in which the presentation is being made. This could involve understanding the audience demographics, the importance of particular slides or sections, or even the mood of the presenter. Based on this analysis, the component may make suggestions for real-time adjustments. The Real-Time Update Component 1006 may be responsible for implementing any changes suggested by the Context Analysis Component 1004. This could include altering the speed of the narration, modifying the sequence of slides, or integrating real-time feedback into the presentation. These updates are meant to enhance the accessibility and effectiveness of the presentation as it is happening. In summary, the Adaptive Real-Time Response Module 220 may serve to make real-time adaptations to a presentation, thereby enhancing its accessibility and effectiveness. It accomplishes this through its Content Monitoring Component 1002, Context Analysis Component 1004, and Real-Time Update Component 1006.

Figure 11:
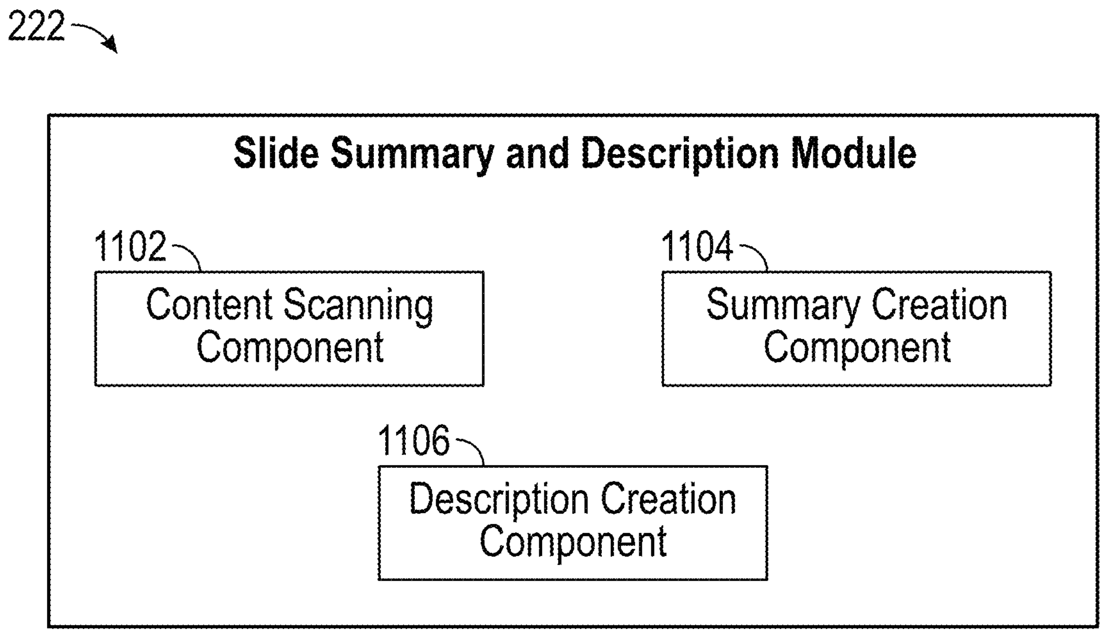
FIG. 11 is a block diagram elaborating on the internal functional components of the Slide Summary and Description Module 222, as referenced in FIG. 2.

Referring to FIG. 11, the block diagram elaborates on the internal functional components of the Slide Summary and Description Module 222, as referenced in FIG. 2. The Overall Image 222 encompasses the various sub-components that collectively provide concise summaries and detailed descriptions of the slides in a presentation.

The Content Scanning Component 1102 may be tasked with examining the content of each slide in a presentation. It may analyze text, images, graphics, and other multimedia elements present on the slide. By scanning the content, it can gather the necessary data required to generate a comprehensive summary and description. The Summary Creation Component 1104 may utilize the data collected by the Content Scanning Component 1102 to create a concise summary of the slide. The goal of this component may be to offer a quick overview of the main points or topics covered in the slide, allowing listeners or readers to quickly grasp the core message. The Description Creation Component 1106 may delve deeper, creating a detailed description of the slide's content. This can be particularly beneficial for individuals who may have visual impairments, providing them with a thorough understanding of the slide's content through audio narration. The description may cover all elements on the slide, including text, graphics, and any other multimedia components, ensuring a comprehensive understanding. In essence, the Slide Summary and Description Module 222 may aim to make presentations more accessible by providing both brief summaries and in-depth descriptions of each slide. This is accomplished through the combined efforts of the Content Scanning Component 1102, Summary Creation Component 1104, and Description Creation Component 1106.

Figure 12:
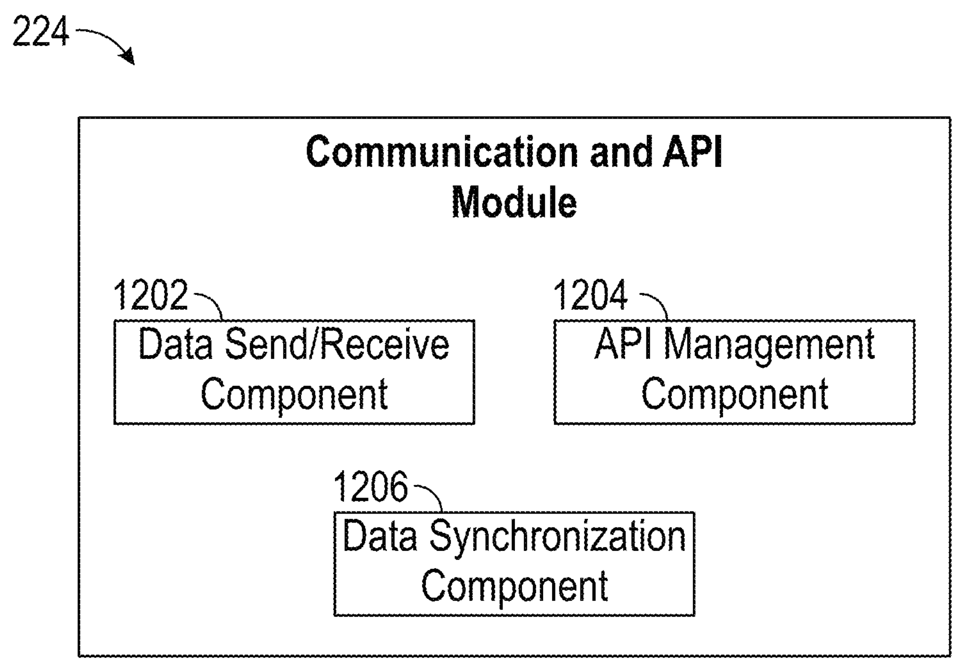
FIG. 12 is a block diagram describing the internal functional components of the Communication and API Module 224, as initially introduced in FIG. 2.

Referring to FIG. 12, the block diagram describes the internal functional components of the Communication and API Module 224, as initially introduced in FIG. 2. The Overall Image 224 encapsulates the key sub-components that facilitate communication and data exchange between the computing and/or communication device and the server, as well as with third-party platforms.

The Data Send/Receive Component 1202 may be responsible for managing the transmission of data to and from the client-side computing and/or communication device and the server. This can include the sending of audio files, text narrations, presentation slides, user settings, and other relevant data that the system may require for real-time audio and text narration. The API Management Component 1204 may handle interactions with third-party services or platforms, which could range from social media networks to other types of multimedia content providers. Through the use of APIs (Application Programming Interfaces), this component may enable seamless integration and data exchange, thus extending the capabilities of the Real-Time Audio and Text Narration Engine.

The Data Synchronization Component 1206 may work in conjunction with the Data Send/Receive Component 1202 and the API Management Component 1204 to ensure that all data across the system is up-to-date and consistent. This might be particularly important when the system is being used on multiple platforms or devices simultaneously. In summary, the Communication and API Module 224 may serve as the backbone for data transfer and communication within the system, and possibly with external platforms. This is enabled by the Data Send/Receive Component 1202, the API Management Component 1204, and the Data Synchronization Component 1206.

Figure 13:
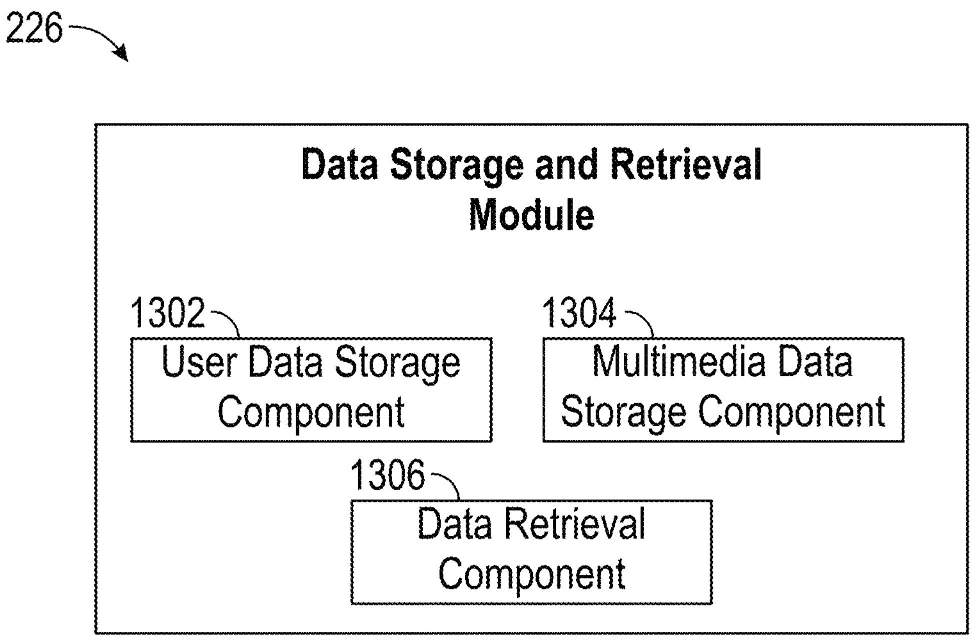
FIG. 13 is a block diagram exposing the internal functional components of the Data Storage and Retrieval Module 226, as cited in FIG. 2.

Referring to FIG. 13, the block diagram exposes the internal functional components of the Data Storage and Retrieval Module 226, as cited in FIG. 2. The Overall Image 226 provides a structural representation of the module designed to facilitate the storage and retrieval of data, including but not limited to, user settings, multimedia files, and other relevant data for the operation of the system.

The User Data Storage Component 1302 may be responsible for securely storing all user-specific data. This could include user settings, preferences, customized profiles, and other data that are crucial for tailoring the presentation experience according to individual needs. The Multimedia Data Storage Component 1304 may handle the storage of all multimedia content that the system processes or generates. This can consist of audio files, text narrations, presentation slides, and even potentially video files or other types of multimedia. The Data Retrieval Component 1306 may manage the fetching of stored data upon request. Whether it is the user who requires a past setting or the system itself that needs to pull up a specific multimedia file for real-time audio and text narration, this component may ensure that the correct data is retrieved quickly and efficiently. In summary, the Data Storage and Retrieval Module 226 may serve as the central repository for all data that the system uses. It may be composed of the User Data Storage Component 1302 for personal settings and profiles, the Multimedia Data Storage Component 1304 for all types of multimedia content, and the Data Retrieval Component 1306 to facilitate timely and accurate data fetching.

Figure 14:
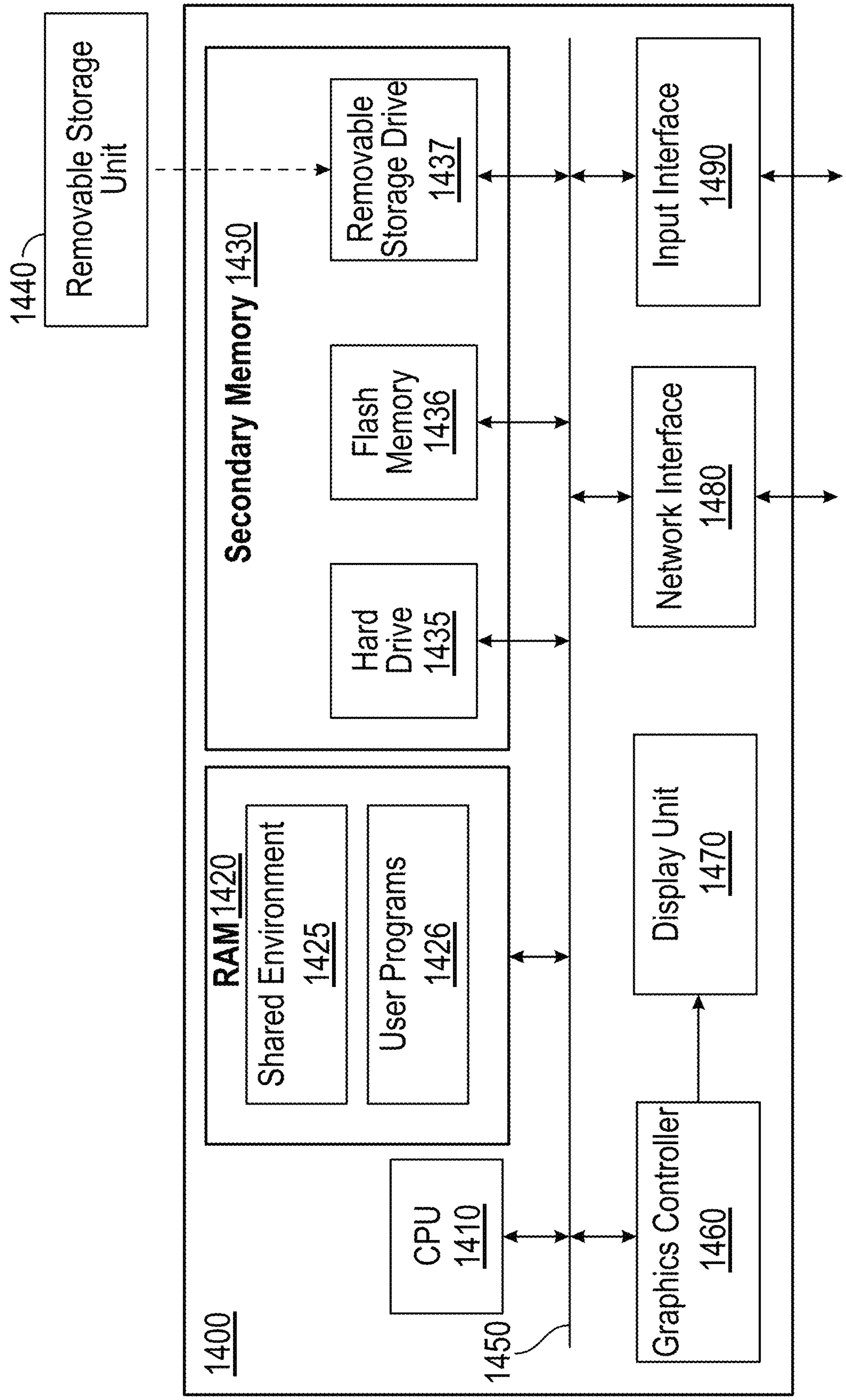
FIG. 14 is a block diagram illustrating the details of a digital processing system in which various aspects of the present disclosure are operative by execution of appropriate software instructions.

Referring to FIG. 14 is a block diagram 1400 illustrating the details of a digital processing system 1400 in which various aspects of the present disclosure are operative by execution of appropriate software instructions. The Digital processing system 1400 may correspond to the computing and/or communication devices (or any other system in which the various features disclosed above can be implemented). Digital processing system 1400 may contain one or more processors such as a central processing unit (CPU) 1410, random access memory (RAM) 1420, secondary memory 1430, graphics controller 1460, display unit 1470, network interface 1480, and input interface 1490. All the components except display unit 1470 may communicate with each other over communication path 1450, which may contain several buses as is well known in the relevant arts. The components of FIG. 14 are described below in further detail.

CPU 1410 may execute instructions stored in RAM 1420 to provide several features of the present disclosure. CPU 1410 may contain multiple processing units, with each processing unit potentially being designed for a specific task. Alternatively, CPU 1410 may contain only a single general-purpose processing unit. RAM 1420 may receive instructions from secondary memory 1430 using communication path 1450. RAM 1420 is shown currently containing software instructions, such as those used in threads and stacks, constituting shared environment 1425 and/or user programs 1426. Shared environment 1425 includes operating systems, device drivers, virtual machines, etc., which provide a (common) run time environment for execution of user programs 1426.

Graphics controller 1460 generates display signals (e.g., in RGB format) to display unit 1470 based on data/instructions received from CPU 1410. Display unit 1470 contains a display screen to display the images defined by the display signals. Input interface 1490 may correspond to a keyboard and a pointing device (e.g., touch-pad, mouse) and may be used to provide inputs. Network interface 1480 provides connectivity to a network (e.g., using Internet Protocol), and may be used to communicate with other systems (such as those shown in FIG. 1) connected to the network. Secondary memory 1430 may contain hard drive 1435, flash memory 1436, and removable storage drive 1437. Secondary memory 1430 may store the data software instructions (e.g., for performing the actions noted above with respect to the Figures), which enable digital processing system 1400 to provide several features in accordance with the present disclosure.

Some or all of the data and instructions may be provided on removable storage unit 1440, and the data and instructions may be read and provided by removable storage drive 1437 to CPU 1410. Floppy drive, magnetic tape drive, CD-ROM drive, DVD Drive, memory, removable memory chip (PCMCIA Card, EEPROM) are examples of such removable storage drive 1437. Removable storage unit 1440 may be implemented using medium and storage format compatible with removable storage drive 1437 such that removable storage drive 1437 can read the data and instructions. Thus, removable storage unit 1440 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 1440 or hard disk installed in hard drive 1435. These computer program products are means for providing software to digital processing system 1400. CPU 1410 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 1430. Volatile media includes dynamic memory, such as RAM 1420. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fibre optics, including the wires that comprise bus (communication path) 1450. Transmission media can also take the form of acoustic or light waves, such as those generated during radio-wave and infra-red data communications.

Figure 15:
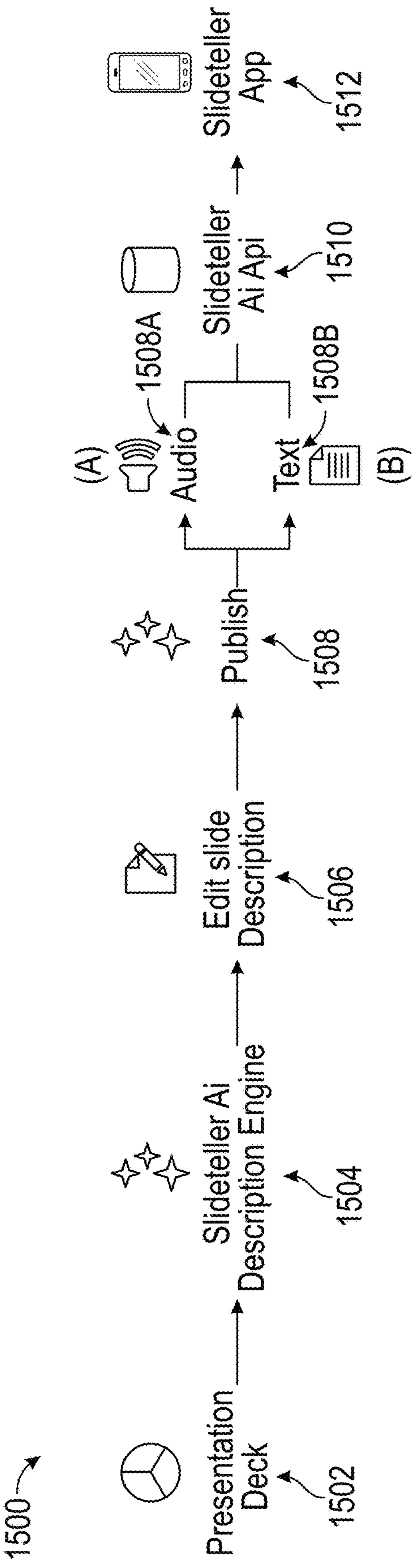
FIG. 15 is an example diagram illustrating one or more exemplary applications of the present disclosure, showcasing the practical implementation of the system as Slide-Teller application.

Referring to FIG. 15, the example diagram illustrates one or more exemplary applications of the present disclosure, showcasing the practical implementation of the system as the ‘Slide-Teller’ application. The Overall Image 1500 provides a structural representation of how the Slide-Teller application interfaces with various elements to enhance presentation accessibility through real-time audio and text narration.

The Presentation Deck 1502 may represent the collection of slides that the presenter wishes to showcase. It may contain various forms of content including text, images, videos, and other multimedia elements. The SlideTeller AI Description Engine 1504 may be the core component that generates real-time audio and text narrations for each slide in the Presentation Deck 1502. This engine may utilize advanced algorithms to interpret and describe the contents of each slide accurately. The Edit Slide Description 1506 may be a feature that allows the presenter to manually edit or approve the AI-generated slide descriptions. This feature may offer greater control over the content and its representation during the presentation. The Publish 1508 function may be used to finalize the presentation, making it ready for public or private viewing. The system may generate two types of output, namely Audio 1508A and Text 1508B. Audio 1508A can be an audio narration of the slide contents, while Text 1508B can be a textual description or summary.

The SlideTeller AI API 1510 may serve as the interface between the Slide-Teller application and other third-party services or applications. This may allow for extended functionality and integration beyond the native capabilities of the Slide-Teller application.

The SlideTeller APP 1512 may be the client-side application through which end-users interact with the presentation. It may provide various features such as real-time narration playback, textual summaries, and possibly other interactive elements to enrich the presentation experience. In summary, FIG. 15 may showcase the Slide-Teller application’s ability to take a Presentation Deck 1502, analyze it through the SlideTeller AI Description Engine 1504, and publish the finalized content in both audio and text formats via Publish 1508. All these functionalities may be made available to both presenters and viewers, ensuring a more accessible and engaging presentation experience.

Figure 16A:
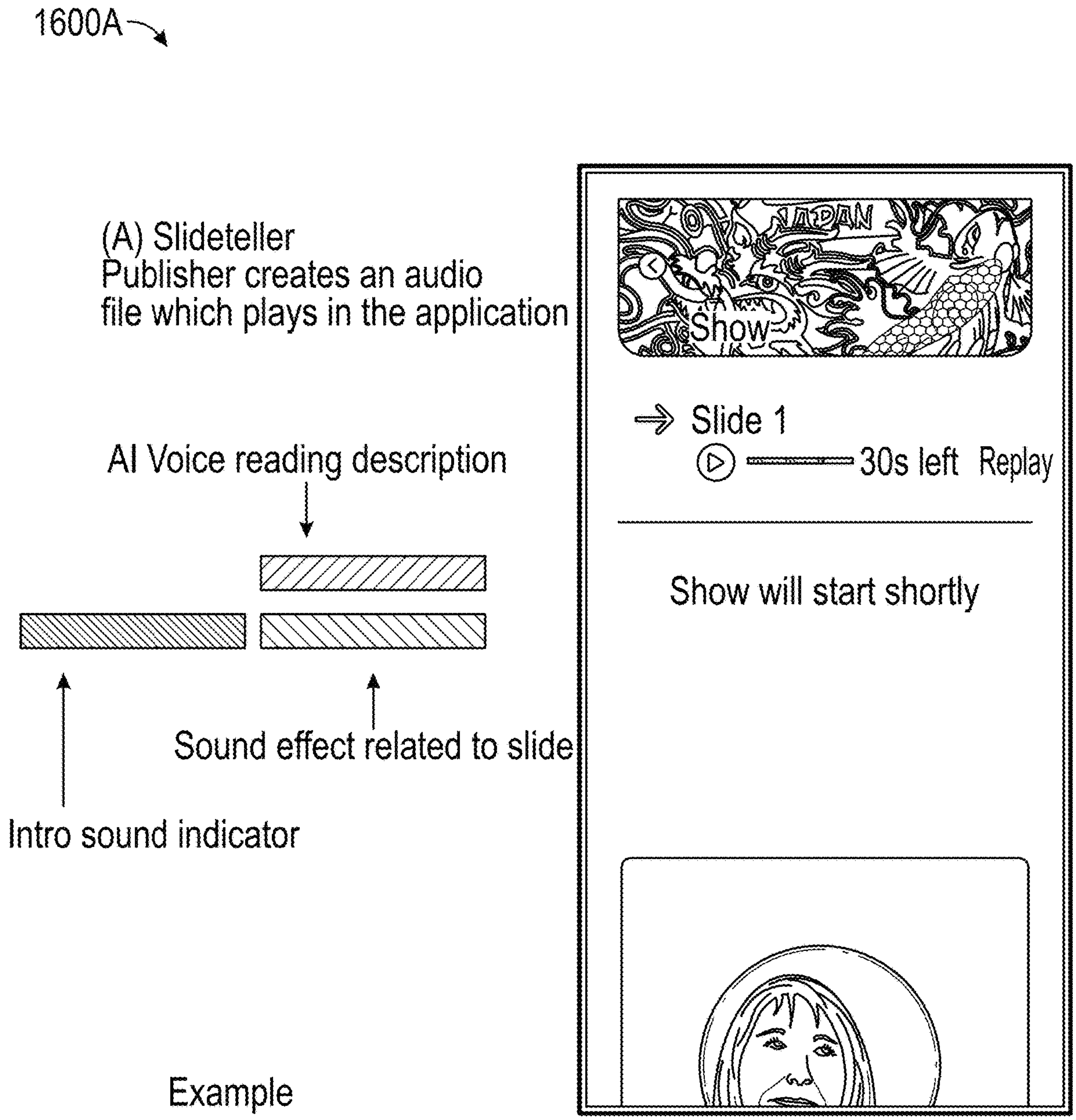
FIG. 16A is an example diagram illustrating one or more exemplary applications of the present disclosure, highlighting the practical operation of Slide-Teller in generating an audio file for playback within the application.

Referring to FIG. 16A, the diagram is an example that illustrates one or more exemplary applications of the present disclosure. It specifically highlights the practical operation of the Slide-Teller system in generating an audio file for playback within the application. In this figure, the “Slide-Teller Publisher” serves as the core component responsible for creating the audio file that plays in the application.

The audio playback generated by the Slide-Teller Publisher may consist of several segments, providing a rich and interactive user experience. These segments include an Into-sound Indicator: This component serves as an initial auditory cue or signal to the user that an audio file is about to play. The Into-sound Indicator may use a unique sound pattern or melody to capture attention and prepare the user for the upcoming audio content. AI Voice Reading Description: After the Into-sound Indicator, the AI Voice Reading Description component takes over. This feature uses advanced text-to-speech algorithms to convert the slide descriptions into a natural, easy-to-understand voice narration. The narration aims to provide users with a detailed explanation or summary of the slide content, enhancing the overall accessibility and understanding of the presentation. Sound Effects Related to Slide: To further enrich the audio experience, Sound Effects Related to Slide are integrated into the audio file. These sound effects may be customized to match the slide content, adding an extra layer of engagement. For example, a slide discussing oceanography might include the sound of waves, while a slide focusing on automotive innovation could incorporate engine sounds.

In summary, FIG. 16A showcases how the Slide-Teller system employs a multi-faceted approach to audio playback, seamlessly combining an Into-sound Indicator, an AI Voice Reading Description, and contextually appropriate Sound Effects to generate a comprehensive and engaging audio experience for users.

Figure 16B:
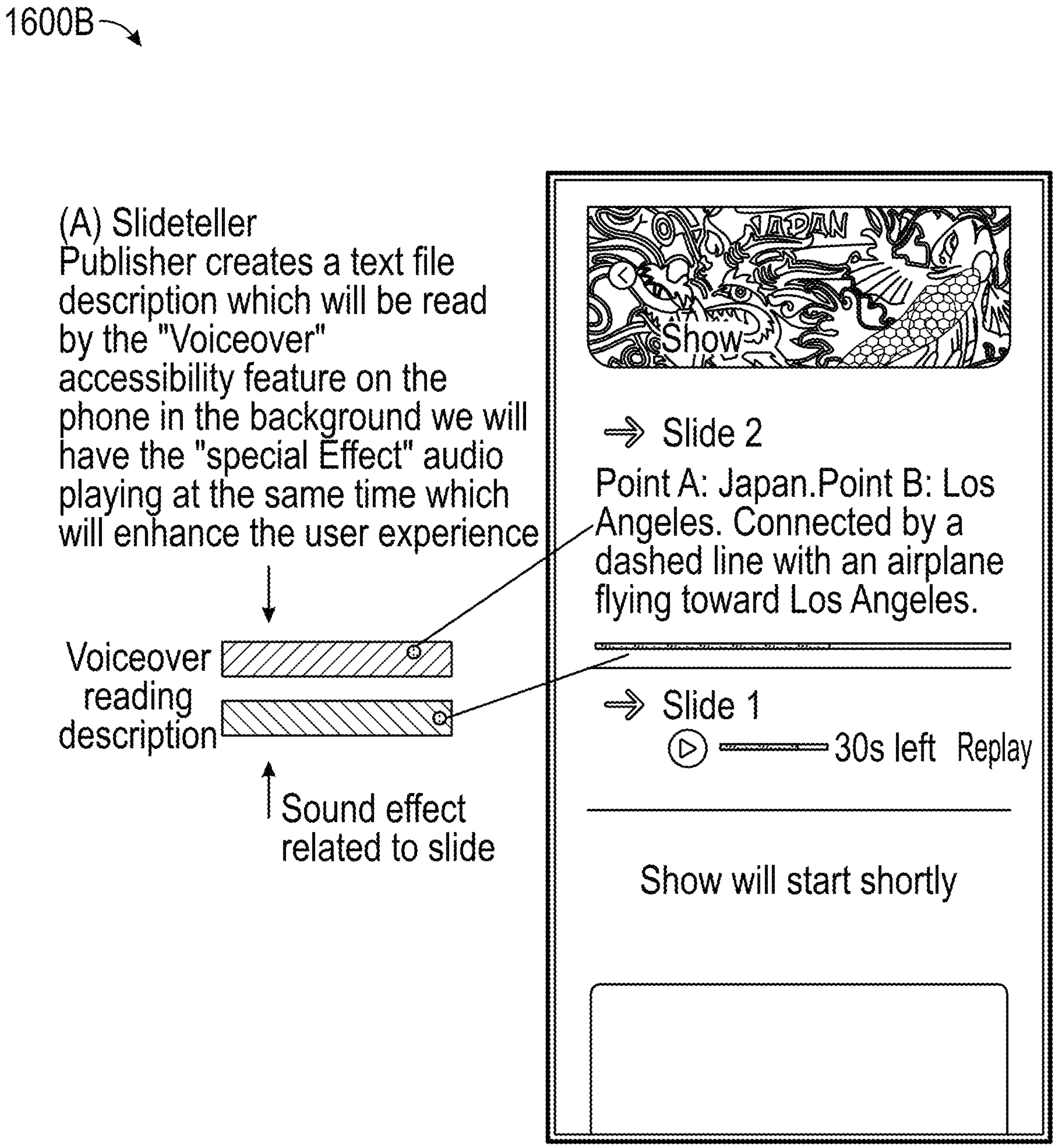
FIG. 16B is an example diagram that illustrates one or more exemplary applications of the present disclosure. It emphasizes the practical functionality of Slide-Teller in generating a text file description while concurrently playing special effect audio within the application.

Referring to FIG. 16B is an example diagram that illustrates one or more exemplary applications of the present disclosure. This figure emphasizes the practical functionality of Slide-Teller in generating a text file description while concurrently playing special effect audio within the application. The Slide-Teller Publisher acts as the main component for generating both the text file and the special effect audio that will be played.

The generated text file is designed to be read by the voiceover accessibility feature commonly found in smartphones and other computing and/or communication devices. The voiceover function may read the text description in the background to enhance the accessibility of the presentation for visually impaired users or those who prefer auditory learning. For example, if the exemplary content shown in the presentation slide is “Point A: Japan, Point B: Los Angeles. Connected by a dashed line with an airplane flying toward Los Angeles,” then the voiceover accessibility feature would read this text description out loud. It provides the user with an auditory understanding of the slide’s visual elements, narrating the objects and their interactions, such as the airplane flying from Japan to Los Angeles.

Concurrent with the voiceover reading, special effect audio may be played to enrich the user’s experience. These sound effects are custom-tailored to the slide’s content. In the given example, one could imagine the sound of an airplane taking off or flying in the sky, adding an additional layer of context and immersion for the user. In summary, FIG. 16B showcases the ability of the Slide-Teller system to enhance user engagement and accessibility. It does this by generating a text file that can be read by voiceover services while simultaneously playing contextually appropriate special effect audio. This multi-layered approach offers a more comprehensive and immersive experience for all users.

Figure 17:
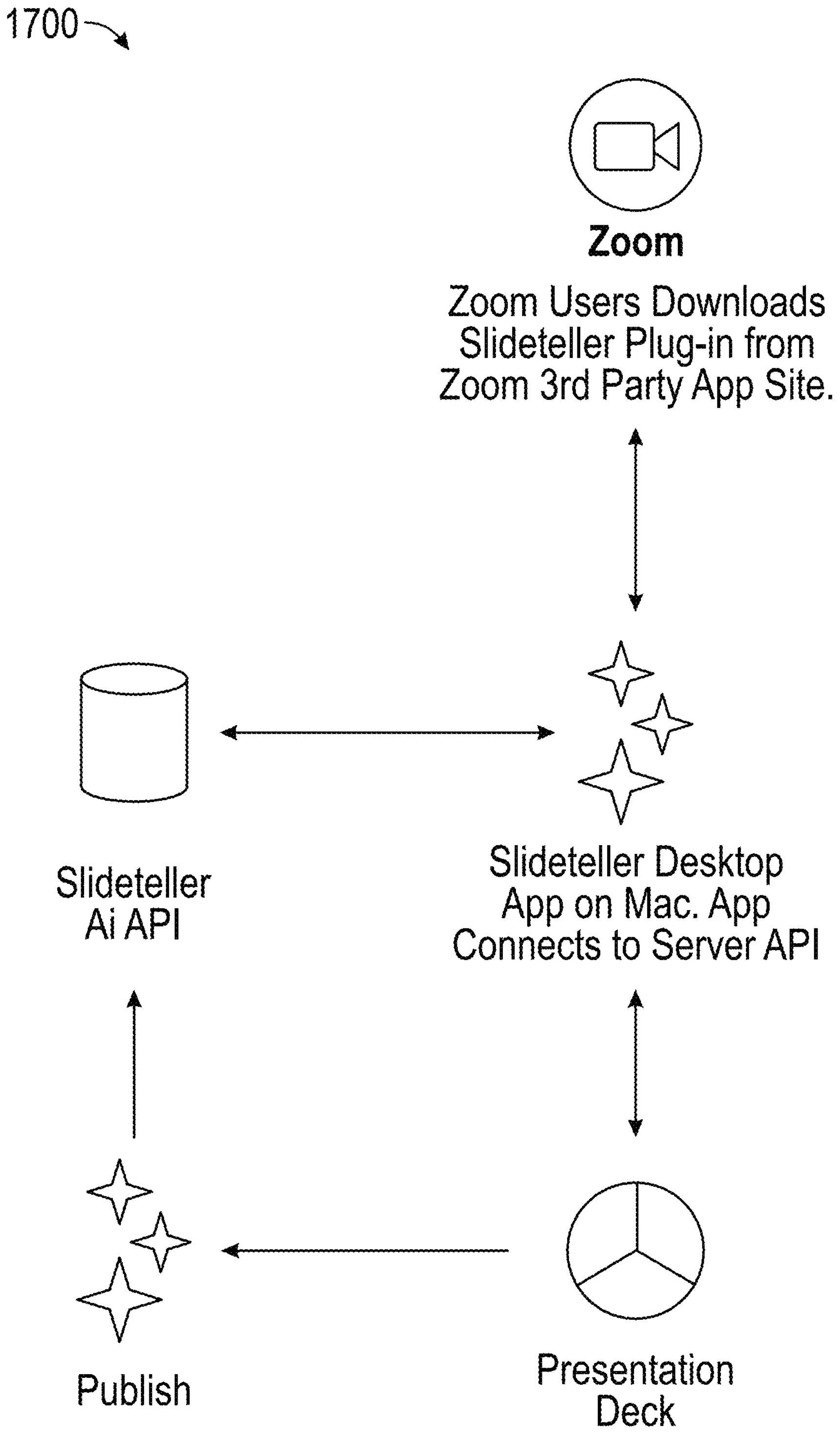
FIG. 17 and FIG. 18 are an example diagrams that illustrates one or more exemplary applications of the present disclosure, emphasizing the practical functionality of Slide-Teller as a plug-in tool compatible with one or more third-party applications.
Figure 18:
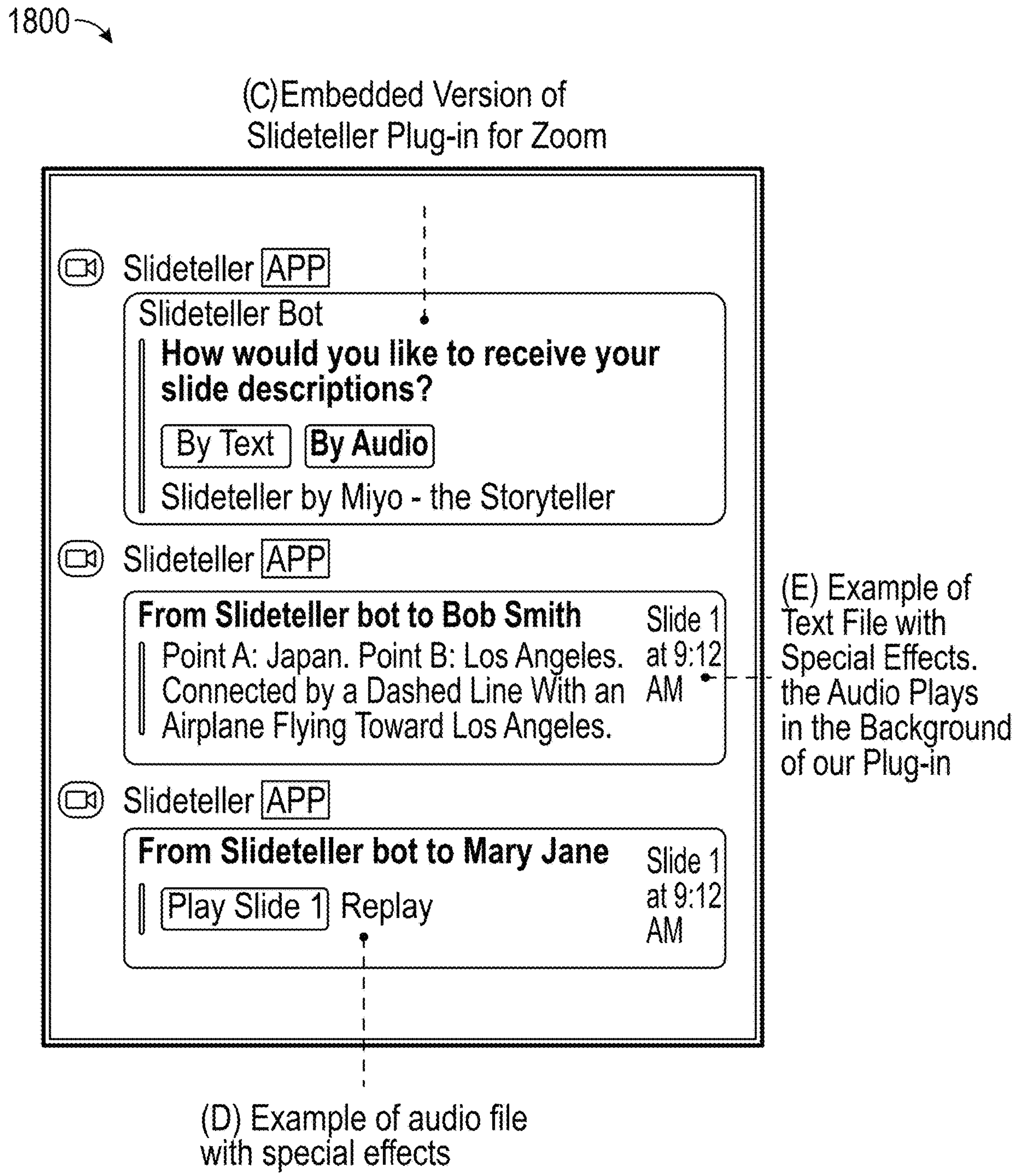

Referring to FIG. 17 and FIG. 18 are example diagrams that illustrate one or more exemplary applications of the present disclosure, emphasizing the practical functionality of Slide-Teller as a plug-in tool compatible with one or more third-party applications. These figures showcase how Slide-Teller can be integrated into existing ecosystems to enhance the user experience for online presentations.

In FIG. 17, an exemplary use case is demonstrated wherein Zoom users may download the Slide-Teller plug-in from the Zoom 3rd party app site. Once downloaded and installed, the Slide-Teller Desktop app on a Mac may connect to a server API. This enables the user to load their presentation deck into the Slide-Teller app and publish it through the Slide-Teller AI API. The diagram illustrates the functional flow elements involved in operating Slide-Teller within Zoom. When the desktop app launches a presentation deck in play mode, selecting the “next” button or paging forward will trigger the system to send the corresponding audio/text file to a Slide-Teller bot operating within Zoom.

In FIG. 18, to enhance user interaction, the Slide-Teller Bot may present the user with options for receiving slide descriptions, either "By Text" or "By Audio." If the user selects the "By Text" option, the Slide-Teller bot may display text descriptions along with special sound effects that play in the background. Conversely, if the "By Audio" option is chosen, the Slide-Teller bot will provide buttons for playing or replaying audio descriptions that include special sound effects.

In one of the scenarios illustrated in FIG. 18, if a presentation slide shows "Point A: Japan, Point B: Los Angeles" connected by a dashed line with an airplane flying toward Los Angeles, Slide-Teller's specialized functionality becomes particularly useful. If the user has selected the "By Text" option, the Slide-Teller bot might display this description: "Point A: Japan. Point B: Los Angeles. Connected by a dashed line with an airplane flying toward Los Angeles." At the same time, special sound effects, such as the sound of an airplane taking off, could play in the background, enhancing the user's experience.

If the "By Audio" option is selected, the Slide-Teller bot will provide a "play slide 1 button" and a "replay button." Upon selecting the "play slide 1 button," the user will hear an audio narration saying, "Point A is Japan, and Point B is Los Angeles, connected by a dashed line with an airplane flying toward Los Angeles." This narration would be accompanied by the same special sound effects, adding a layer of immersion to the presentation.

According to exemplary embodiments that are not limiting, if certain third-party applications like Apple Keynote or Google Slide do not support plugins, an alternative script-based approach can be taken. This script controls the respective presentation application and connects it to Slide-Teller's API. This enables a Slide-Teller bot to manage various functionalities like audio playback, thereby enhancing accessibility for visually impaired users.

The Slide-Teller script, when run on a Mac, can control PowerPoint or Keynote applications. As the presenter navigates from one slide to another, the script sends either audio or text files to the Slide-Teller bot. The visually impaired user can then access this information via their screen reader. The exemplary script to accomplish this is provided below:

```
-- Start of the exemplary Slide-Teller script for Mac
set theMp3FilesFolderName to "mp3Files"
set theSepearator to "$"
set FolderPath to POSIX path of (((path to me as text) & "::") &
theMp3FilesFolderName &
    ":")
set theSettingsFile to paragraphs of (read file ((POSIX file (POSIX path
of (((path to me as
    text) & "::") & "settings.txt"))) as string))
set theData to { }
set msgSent2 to { }
set nonIgnoredSlides to { }
global theNumbers
set theNumbers to my split(item 1 of theSettingsFile, ",")
repeat with n from 2 to length of theSettingsFile
  set theLine to item n of theSettingsFile
  if theLine is not "" then
      set theSplit to my split(theLine, theSepearator)
      if length of theSplit is 3 then
        set end of theData to theSplit
        set end of nonIgnoredSlides to ((item 1 of theSplit) as number)
      end if
  end if
end repeat
tell application "Keynote"
  activate
end tell
```

-continued

```
delay 0.2
tell application "System Events"
  tell process "Keynote"
      repeat until exists (button "Play" of toolbar 1 of window 1)
      end repeat
      click button "Play" of toolbar 1 of window 1
  end tell
end tell
tell application "Keynote"
  set theDoc to front document
  repeat
      set currentSlide to slide number of current slide of front document
      if nonIgnoredSlides contains currentSlide and msgSent2 does
      not contain
            currentSlide then
        repeat with n in theData
          set theSlideNumber to item 1 of n as number
          set theMessage to item 2 of n
          set theFileName to item 3 of n
          if (currentSlide is theSlideNumber) then
            set end of msgSent2 to currentSlide
            if theFileName is "" then
              my sendmessage(theMessage, "")
            else
              my sendmessage(theMessage, (FolderPath &
              theFileName))
            end if
            exit repeat
          end if
        end repeat
      end if
  end repeat
end tell
to split(someText, delimiter)
  set AppleScript's text item delimiters to delimiter
  set someText to someText's text items
  set AppleScript's text item delimiters to {""} --> restore delimiters
  to default value
  return someText
end split
on sendmessage(theMessage, theFile)
  repeat with theNumber in theNumbers
      tell application "Messages"
        set targetService to (1st account whose service type =
        iMessage)
        set targetBuddy to participant (theNumber) of targetService
        if (theMessage is not equal to "") then
          send theMessage to targetBuddy
        end if
      end tell
      if (theFile is not "") then
        set theFile to ((POSIX file (theFile)) as string) --as alias
        tell application "Shortcuts Events"
          run shortcut named "FileSender" with input {theFile,
          theNumber} --pass
                list { } or single
        end tell
      end if
  end repeat
end sendmessage
```

In the example script, variables are defined to specify the folder containing MP3 files (theMp3FilesFolderName) and a separator (theSepearator). The script then uses System Events and AppleScript to interact with the Keynote application. It starts the presentation and monitors the current slide. If a slide that is not to be ignored is displayed (nonIgnoredSlides), and it has not already been processed (msgSent2), the script will send the corresponding message and/or audio file. In essence, the Slide-Teller system employs this script as an intermediary between the presentation software and its bot, streamlining the delivery of audio or text descriptions to enhance the experience for all users, including those with visual impairments.

In another exemplary embodiment, PowerPoint users can benefit from Slide-Teller's functionality through a feature known as Add-Ons. Upon installing the Slide-Teller Add-On, users have the option to either manually add slide descriptions or have the Slide-Teller AI generate descriptions for them. These descriptions can be edited as needed, and the presentation can be published to generate the necessary assets and upload them to the server.

Figure 19:
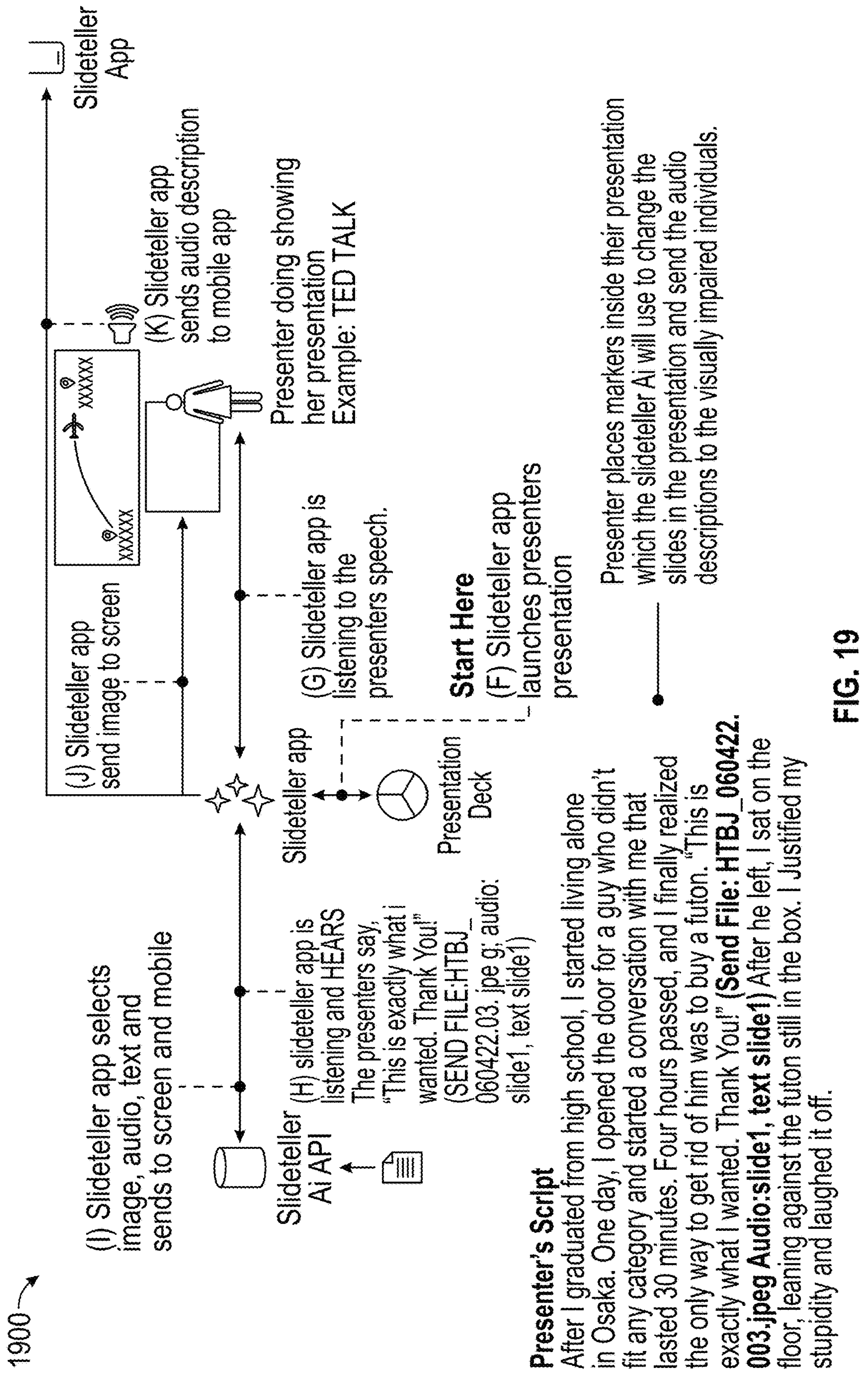
FIG. 19 is an example diagram illustrating one or more exemplary applications of the present disclosure. It highlights the practical functionality of Slide-Teller in monitoring the presenter's speech to automatically change slides in the presentation, while concurrently sending audio descriptions to visually impaired individuals.

Referring to FIG. 19 is an example diagram illustrating one or more exemplary applications of the present disclosure. This figure serves to highlight the practical functionality of Slide-Teller in monitoring the presenter's speech to automatically change slides in the presentation, while concurrently sending audio descriptions to visually impaired individuals. The process begins when the Slide-Teller app initiates the presenter's presentation, setting the stage for the unfolding series of events. This initiation phase, denoted as "(F)," is immediately followed by a sophisticated speech monitoring feature, labeled "(G)," wherein the Slide-Teller app actively listens to the presenter's speech. Utilizing natural language processing algorithms, the app is poised to detect cues within the spoken narrative that signal slide transitions or trigger audio descriptions.

As the presenter delivers their predetermined script, which is enriched with embedded markers for multimedia cues, Slide-Teller is ever-attentive. In this example, the script leads up to the phrase, "This is exactly what I wanted. Thank you!" Accompanying this phrase is a special marker that instructs the Slide-Teller system to initiate a slide change and send specific files and descriptions, tagged as "(H)" in the process flow. Upon recognizing this phrase, the Slide-Teller app springs into action. It promptly selects the appropriate image, audio, and text files, denoted as "(I)," and sends them for display on the presentation screen and to mobile devices tailored for visually impaired individuals. The image that aligns with the script's context is projected onto the presentation screen, an action identified as "(J)" in the diagram. Concurrently, the application sends audio descriptions to the mobile app, a feature marked as "(K)," thereby offering an inclusive and enhanced experience for visually impaired attendees. This seamless orchestration of multimedia elements exemplifies Slide-Teller's capability to make presentations more inclusive and accessible.

Figure 20:
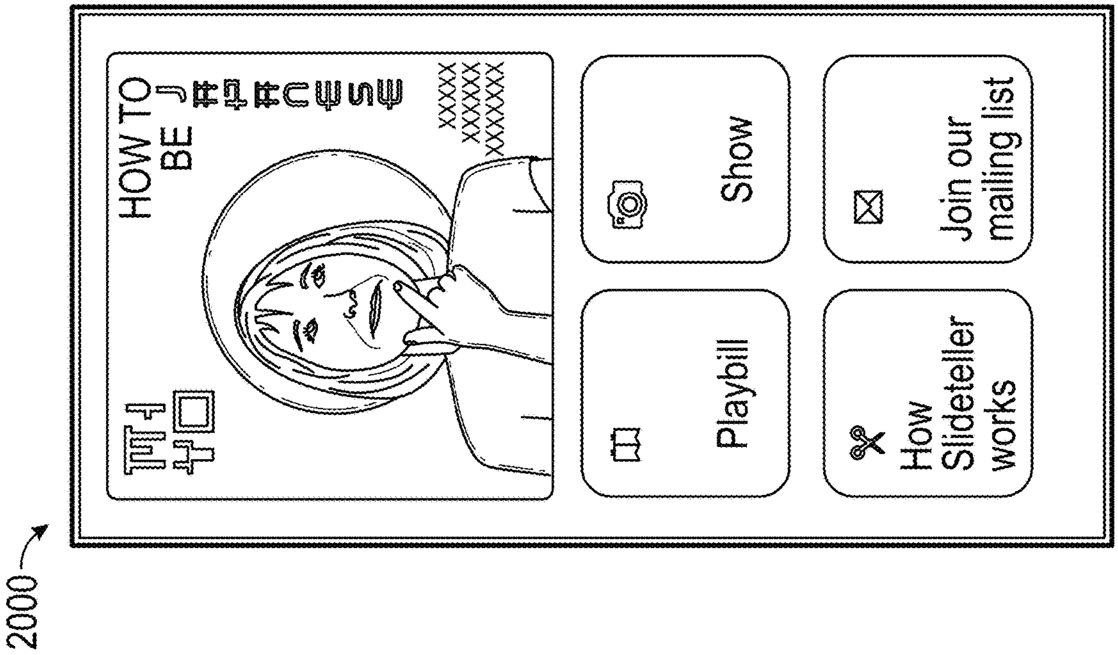
FIG. 20 is a diagram depicting the main screen of the Slide-Teller application, implemented in accordance with one or more non limiting exemplary functional scenarios.

Referring to FIG. 20 is a diagram depicting the main screen of the Slide-Teller application, implemented in accordance with one or more non-limiting exemplary functional scenarios. The main screen serves as the control hub for presenters and may be the initial interface encountered upon launching the Slide-Teller application. It is designed to be a dynamic screen that updates based on the show, providing real-time information and controls to enhance the overall presentation experience.

The interface may include multiple components tailored to the needs of the presenter, such as slide thumbnails, a timer, and audio controls, among others. These components are organized in an intuitive layout that may adapt as the show progresses, offering a seamless and interactive user experience. The dynamism of the screen is evident as slides advance, new audio files are cued, or as new data is input into the system, offering a truly interactive and responsive environment for the presenter.

Features like live captions and real-time annotations may also be available on the main screen, offering auxiliary channels of communication to the audience. These elements not only serve to improve the presentation but may also offer additional layers of accessibility for differently-abled individuals. The main screen may also interface with other modules of the Slide-Teller system, such as the Communication and API Module or the Data Storage and Retrieval Module, enabling a holistic and interconnected operation. In summary, FIG. 20 showcases the potential adaptability and versatility of the Slide-Teller application's main screen, indicating how it may dynamically update to reflect the state of the ongoing presentation, thus providing an efficient, user-friendly, and accessible platform for presenters and audiences alike.

Figure 21:
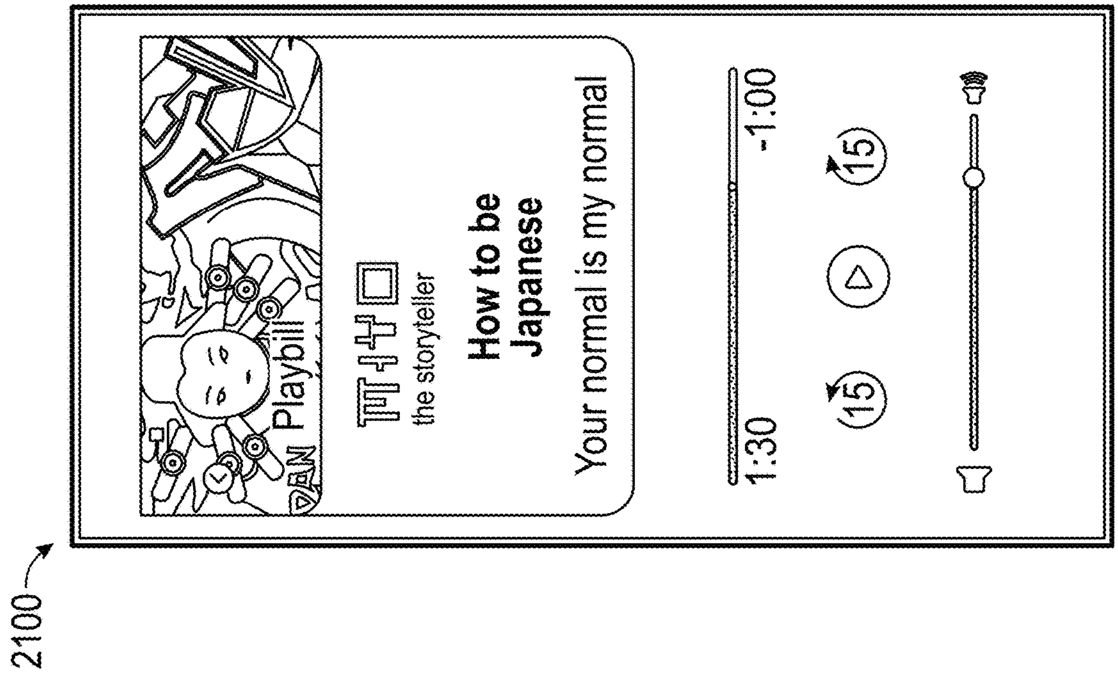
FIG. 21 is a diagram depicting another screen of the Slide-Teller application, specifically highlighting the function related to audio playback.

Referring to FIG. 21 is a diagram depicting another screen of the Slide-Teller application, specifically highlighting the function related to audio playback. In this illustration, the focus is on a feature that offers an audio description of a given Playbill. This feature is tailored to enrich the presentation experience, particularly for visually impaired users, by providing an auditory guide to the content on display.

In an exemplary scenario, upon reaching the Playbill slide, the Slide-Teller application may automatically cue an audio file that provides a comprehensive description of the Playbill's content. This auditory description may serve as an invaluable aid to those who rely on audio cues for comprehension. Furthermore, the screen layout is designed to be intuitive, with easy-to-navigate controls for audio playback, such as play, pause, and skip buttons, allowing the user to control the auditory experience. Additionally, the application may offer the flexibility to switch to a text version of the Playbill description. This option allows users to utilize their own screen reader or voiceover software to read the text, thereby offering another layer of accessibility. Such a feature may be particularly beneficial for those who prefer reading at their own pace or those who may want to use a specific voiceover service that they are accustomed to.

In summary, FIG. 21 accentuates the application's commitment to inclusivity and user-friendliness by providing multiple options for accessing Playbill information. Whether through pre-recorded audio descriptions or the option to switch to a text-based version, the Slide-Teller application aims to cater to a broad range of user preferences and needs, thereby enhancing the overall presentation experience.

Figure 22:
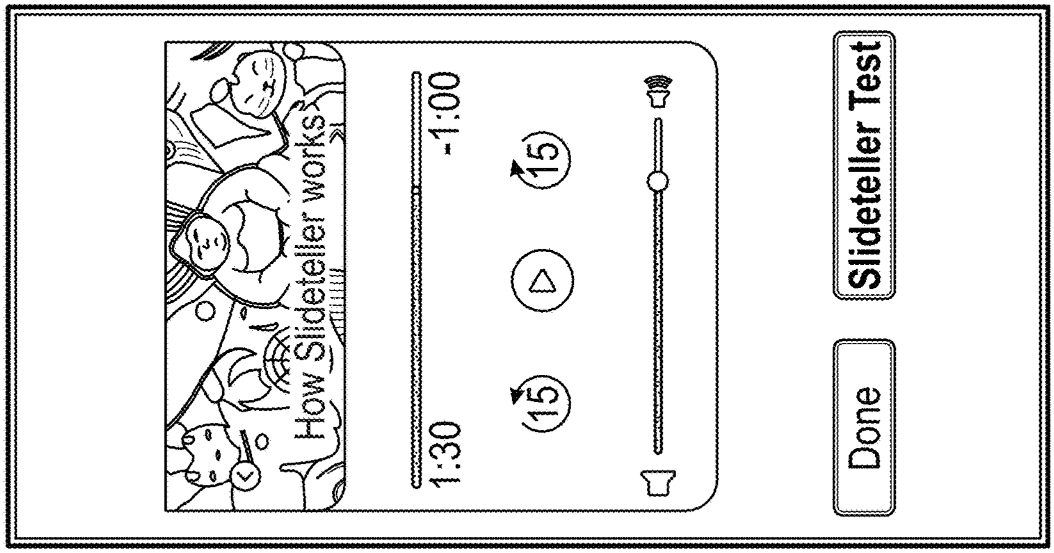
FIG. 22 is a diagram that illustrates another screen of the Slide-Teller application, with a specific focus on the functionality associated with voiceover and special effect integration.

Referring to FIG. 22 is a diagram that illustrates another screen of the Slide-Teller application, with a specific focus on the functionality associated with voiceover and special effect integration. This diagram provides a comprehensive view into how the application aims to enhance accessibility and user engagement, particularly for individuals with visual impairments.

In line with the operation of Slide-Teller, the first step involves the Admin or AI sending an audio file or text description to the user's phone. The design takes into account the public nature of presentations; hence the phone may not play the audio unless headphones are connected to prevent disturbing the audience around the user. Upon displaying a new slide in the app, the user may receive a haptic notification or vibration as an initial alert. This is particularly useful for visually impaired users as it serves as a tactile indicator that new content is available for review. Following the haptic notification, the user may then select the "Play" button on the interface. Once activated, the app may first play a sound indicator as an additional prompt, immediately followed by the audio description of the slide. This sequence ensures that the user is adequately prepared to receive the information being presented.

For those who prefer reading, the application may also offer an option to display a text version of the slide description. Users can let their own voiceover reader interpret this text, thus giving them the freedom to utilize accessibility features they are comfortable with. After the audio has been played or the text has been read, the user may have the option to replay either the text or the audio, affording them the opportunity to review the content as many times as needed for comprehension.

Lastly, the user interface may include settings that allow personalization based on individual preferences. These settings may cover options for language selection, speed of playback, and volume control. In summary, FIG. 22 elucidates how Slide-Teller integrates multiple layers of functionality to cater to a diverse user base. From initial haptic notifications to customizable settings, the application aims to provide a user-centered approach to accessing presentation content, thereby enhancing the overall experience for individuals with or without visual impairments.

Figure 23:
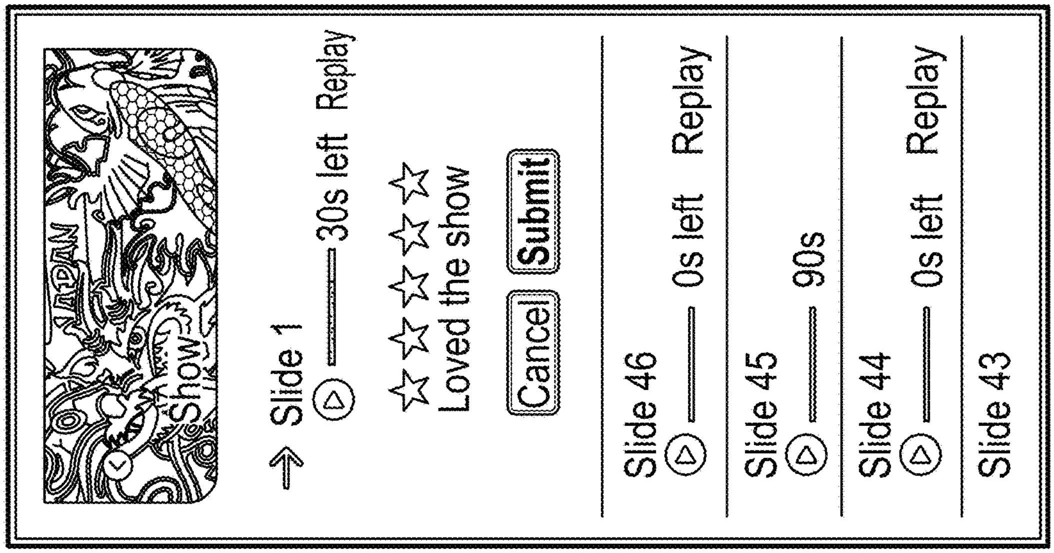
FIG. 23 is a diagram depicting another screen of the Slide-Teller application, specifically highlighting the feature related to real-time feedback.

Referring to FIG. 23, the diagram depicts another screen of the Slide-Teller application, specifically highlighting the feature related to real-time feedback. This functionality is instrumental in capturing user sentiments and experiences, thereby allowing the application to adapt and improve over time. Upon completion of the slide process, the application may prompt the user to participate in rating the presentation. This interactive feature serves as a conduit for collecting immediate reactions and assessments from the audience, enriching the pool of feedback data available to the presenter and the Slide-Teller team.

Moreover, the audio files sent to the users may include special effects layered in the background. These special effects aim to elevate the auditory experience and contribute to a more engaging and dynamic presentation. By incorporating auditory embellishments, the application not only conveys the slide information but also aims to capture and sustain user attention throughout the show.

In cases where text is sent to the users, the Slide-Teller application may possess the capability to concurrently handle both text and audio. Specifically, while the voiceover feature reads the text aloud for the user, special effect audio may play in the background. This dual functionality could further enrich the multi-sensory experience for the user, combining textual, auditory, and even haptic elements for a more comprehensive engagement with the content. In summary, FIG. 23 shines a spotlight on the application's commitment to user-centric design, as it incorporates real-time feedback loops and multi-layered sensory experiences. These features demonstrate Slide-Teller's effort to offer a more interactive and engaging way to access presentation content.

Figure 24:
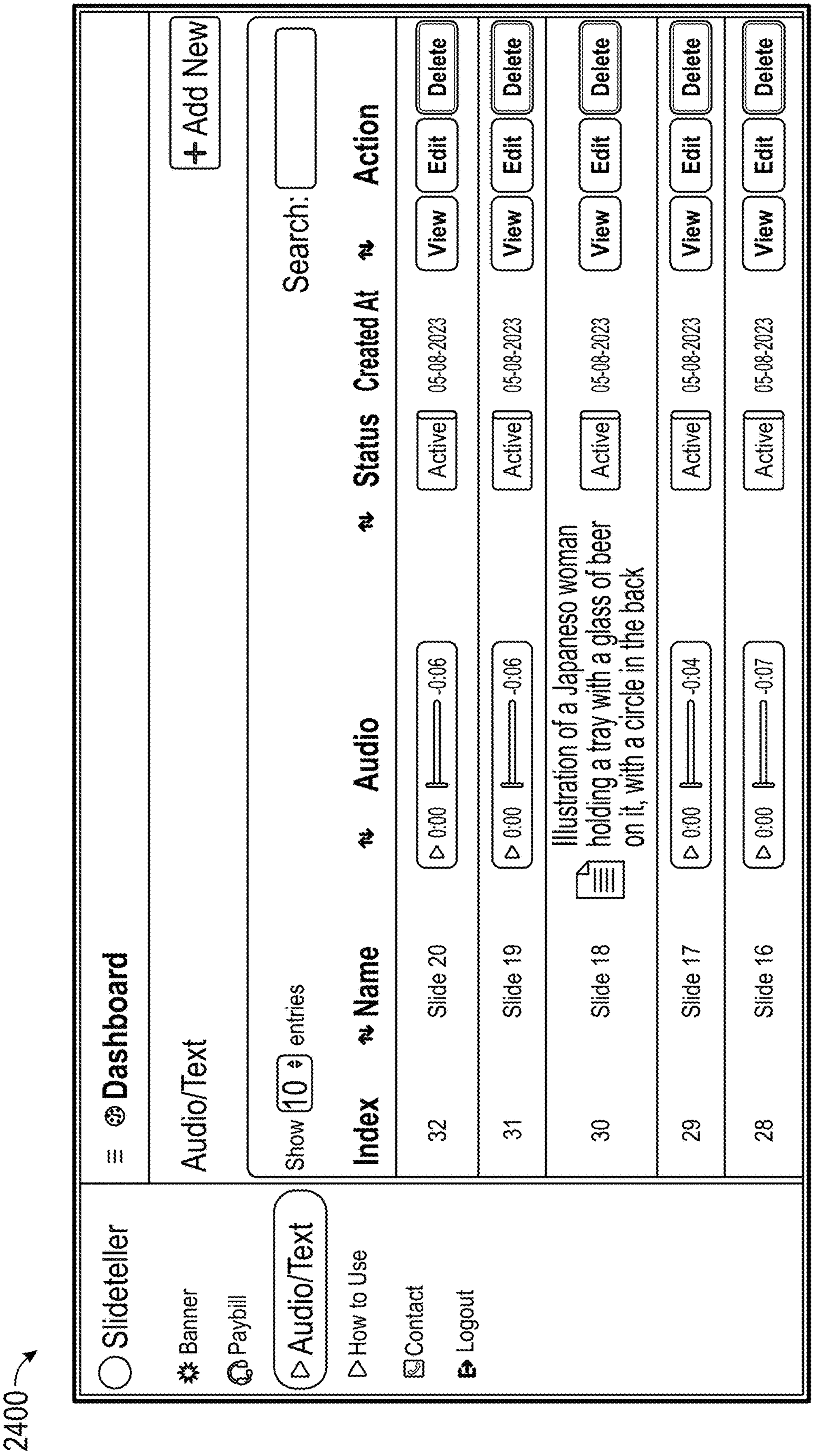
FIG. 24 is a diagram illustrating the Slide-Teller application programming interface (API), which is employed to manage communication between the presenter and the users.

Referring to FIG. 24, the diagram illustrates the Slide-Teller application programming interface (API), which is employed to manage communication between the presenter and the users. This integral component serves as the backbone for orchestrating the real-time interactions and data exchanges that occur during a Slide-Teller-enhanced presentation.

The Slide-Teller API may be designed to handle various functionalities of the dynamic app, categorically segmented into basic features for user-friendly navigation. These features may include the Main screen, which serves as the landing page and central hub for accessing other functionalities. Another notable feature is the Playbill for the show, which offers an overview of the presentation and can also include additional media such as descriptive audio. Within the presentation, the Show slides feature is where the core of the presentation takes place, displaying the slides in real-time as the presenter advances through them. It is within this section that a rating system for the show may be embedded, offering users the opportunity to provide real-time feedback on individual slides or the presentation as a whole.

The How Slide-Teller Works feature is another fundamental aspect managed by the API. This section serves an educational purpose, explaining to users how to get the most out of the Slide-Teller experience, including how to switch between audio and text descriptions. Lastly, a Join Mailing List feature may be included, serving as an opt-in mechanism for users who wish to stay updated on future presentations or updates to the Slide-Teller application itself. In essence, FIG. 24 outlines how the Slide-Teller API could be structured to facilitate a seamless communication pipeline between the presenter and the audience, all while managing the diverse features that make up the Slide-Teller experience. This architecture demonstrates the API's critical role in not only facilitating real-time interactions but also in enhancing the overall user experience.

Figure 25:
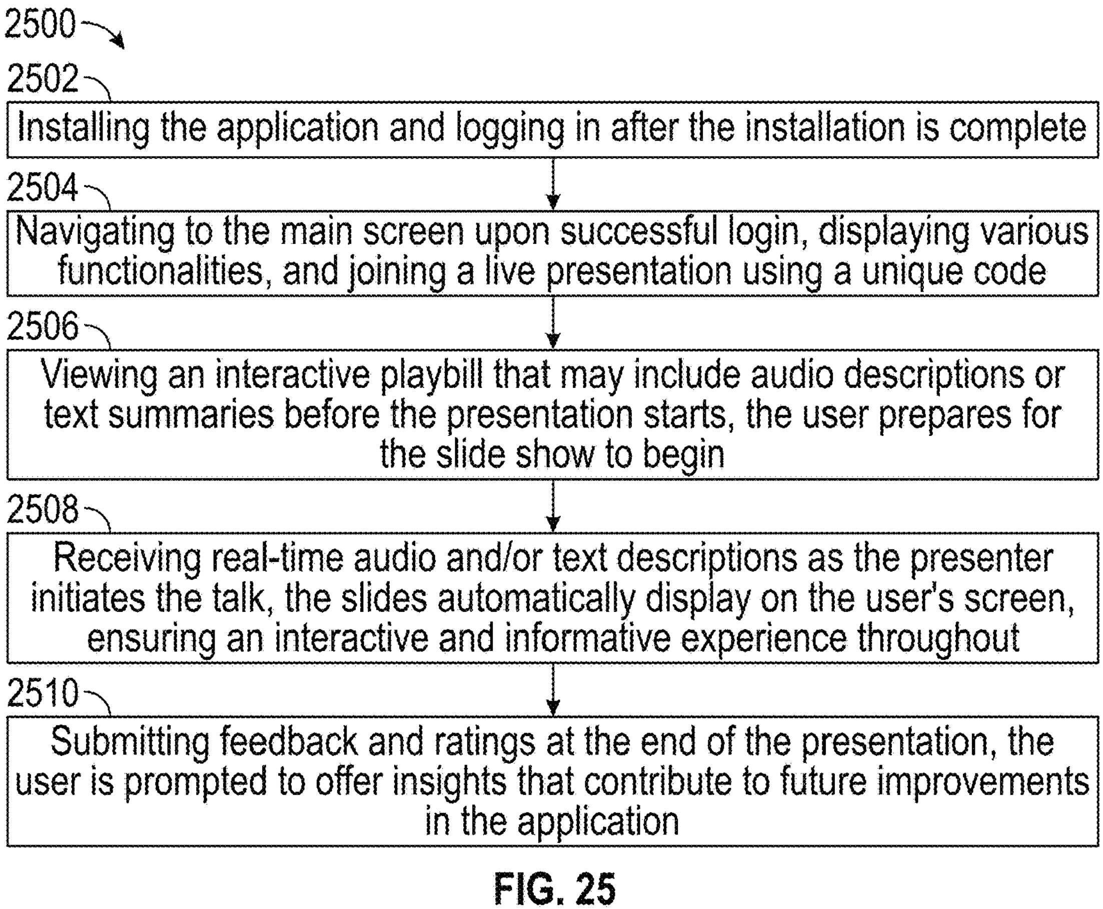
FIG. 25 is a flow diagram that outlines the user's experience while navigating through the Slide-Teller application.

Referring to FIG. 25, the flow diagram outlines the user's experience while potentially navigating through the Slide-Teller application. The diagram is segmented into various steps, each elucidating a different aspect of the user journey that one may encounter. The process may commence with step 2502, where the user may install the application and log in after the installation is potentially complete. This foundational action sets the stage for any subsequent interactions within the application. This is followed by step 2504, where the user may navigate to the main screen upon successful login. This screen may display various functionalities and could allow the user to join a live presentation by inputting a unique code. This step is important for potentially orienting the user and assisting them to engage with live content. Step 2504 is succeeded by step 2506, where the user may view an interactive playbill that could include audio descriptions or text summaries. This may serve as a preparatory stage before the actual slide show begins, possibly priming the user for the presentation they are about to witness.

Immediately after step 2506, the user may transition to step 2508. In this phase, the user could receive real-time audio and/or text descriptions as the presenter may initiate the talk. The slides may automatically display on the user's screen, offering a potentially interactive and informative experience throughout the presentation. The final segment of the user's journey is outlined in step 2510. Here, the user may be prompted to submit feedback and ratings at the conclusion of the presentation. This step not only allows for potential immediate user interaction but also may contribute valuable insights that could be used for future improvements in the application. In summary, FIG. 25 offers a holistic view of how a user may interact with the Slide-Teller application, from installation to feedback submission, ensuring a comprehensive and interactive user experience.

Figure 26:
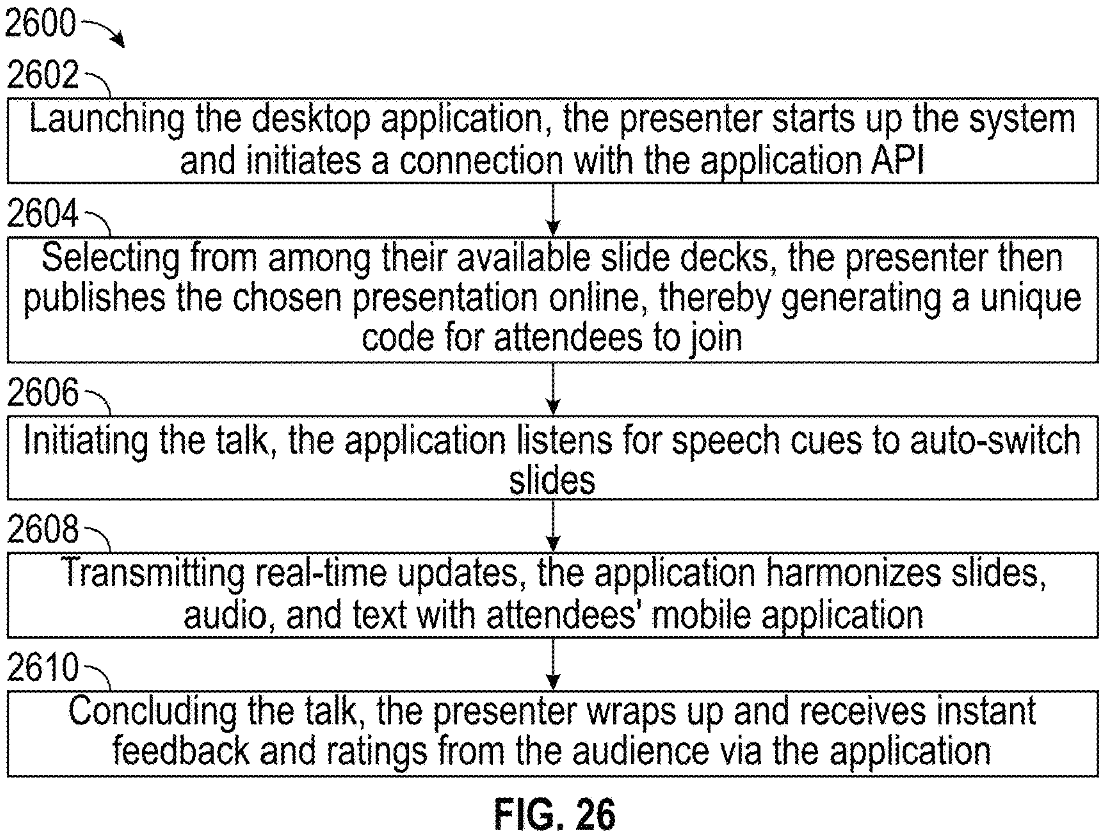
FIG. 26 is a flow diagram that outlines the presenter's experience while navigating through the Slide-Teller application.

Referring to FIG. 26, the flow diagram provides a detailed outline of the presenter's experience one may anticipate while navigating through the Slide-Teller application. The flow is broken down into discrete steps to facilitate comprehension of each crucial phase that the presenter might go through. The process may begin with step 2602, where the presenter may launch the desktop application. This step may involve starting up the system and initiating a connection with the application API. The action lays the groundwork for all subsequent operations within the presentation framework. This step is followed by step 2604, where the presenter may select from among their available slide decks. After the selection, they might then publish the chosen presentation online, which could generate a unique code for attendees to join. This part of the process is instrumental in setting up the presentation and inviting audience participation.

After step 2604, the sequence moves to step 2606. In this stage, the presenter may initiate the talk. The application might listen for specific speech cues from the presenter to auto-switch slides. This feature could ensure a smooth flow during the presentation, reducing manual intervention to a minimum. Step 2606 is followed by step 2608, in which the application may transmit real-time updates. During this phase, the application could harmonize the slides, audio, and text with the attendees' mobile application, maintaining a coherent and synchronized experience for all involved.

Finally, the presenter's journey culminates in step 2610. At this point, the presenter may conclude the talk and could receive instant feedback and ratings from the audience via the application. This final step may provide the presenter with immediate insights into the success and areas for improvement in their presentation. To sum it up, FIG. 26 illustrates the multi-faceted journey a presenter may undergo from launching the application to receiving audience feedback, all while potentially utilizing the full range of features that the Slide-Teller application might offer.

Figure 27:
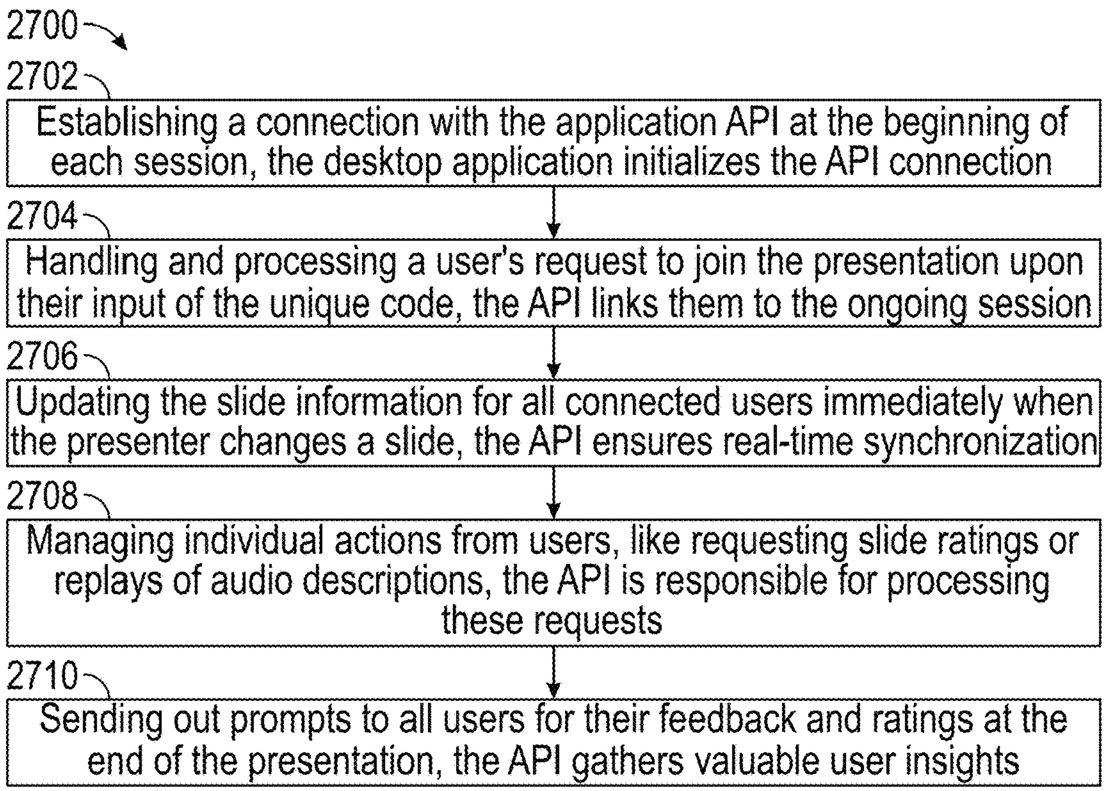
FIG. 27 is a flow diagram illustrating the procedure for engagement with the application programming interface.

Referring to FIG. 27, the flow diagram elucidates the procedure one may expect for engagement with the application programming interface (API). The diagram aims to shed light on various steps involved in ensuring seamless API integration and functionality within the desktop application. The first in the series of steps is step 2702, where establishing a connection with the application API may be paramount. At the beginning of each session, the desktop application might initialize this connection with the API. This foundational step serves as a gateway for all forthcoming interactions between the application and the API. Following step 2702 is step 2704, focused on handling and processing a user's request to join a live presentation. Upon the user's input of the unique code, the API may link them to the ongoing session. This linkage is essential for ensuring that the user gains timely access to the presentation.

Step 2704 is succeeded by step 2706, where the API might be tasked with updating slide information for all connected users in real-time. Whenever the presenter alters a slide, the API may ensure immediate synchronization across all user interfaces. This step is crucial for maintaining coherence and a unified experience during the presentation. Step 2708 follows, focusing on managing individual actions from users, such as requests for slide ratings or replays of audio descriptions. In this step, the API may be responsible for processing these specific requests and ensuring they are met in a timely manner. This capability allows for a personalized and interactive experience for each user.

The last step in this flow is step 2710, where the API may send out prompts to all users for their feedback and ratings at the end of the presentation. By doing so, the API could gather valuable user insights, which may be used for further refinement and improvement of the application. In summary, FIG. 27 outlines a comprehensive series of steps that outline how the application's API may manage various user and presenter interactions, from session initialization to gathering feedback, thereby ensuring a smooth and engaging experience.

Figure 28:
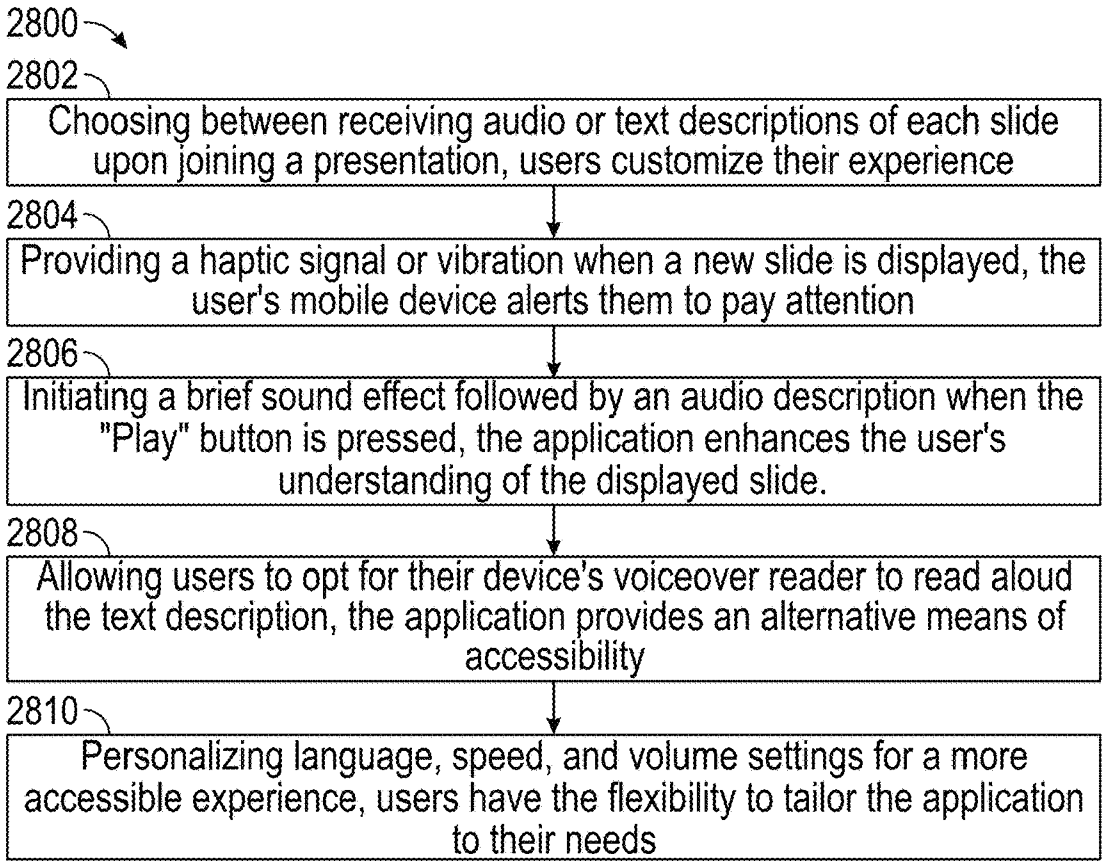
FIG. 28 is a flow diagram outlining the steps for interacting with the various features of the application.

Referring to FIG. 28, the flow diagram offers a detailed outline of the steps one may expect for interacting with the various features of the application. The diagram is structured to give a comprehensive view of the functionality and customization options available to users. At step 2802, where the user may choose between receiving audio or text descriptions for each slide as they join a presentation. This step lays the foundation for personalizing the user's experience and ensures that the user interacts with the presentation in a manner most comfortable to them. Step 2802 is followed by step 2804, which entails the provision of a haptic signal or vibration by the user's mobile device when a new slide is displayed. This feature may serve as an attention cue, notifying the user that a new slide has been presented and that their focus is required. Subsequent to step 2804 is step 2806. Here, when the "Play" button is pressed, the application may initiate a brief sound effect followed by an audio description. This dual-mode sensory alert may enhance the user's understanding and engagement with the slide currently on display.

Step 2806 leads to step 2808, where the application may allow users to opt for their device's voiceover reader to read aloud the text description of a slide. This option provides an alternative means of accessibility, granting users another layer of customization and interaction with the content. Concluding the sequence is step 2810. In this step, users may have the option to personalize language, speed, and volume settings for a more accessible experience. This level of customization allows users to tailor the application to better suit their needs and preferences. In summary, FIG. 28 provides a holistic view of the potential steps for interaction, detailing how users may customize and engage with the application from the point of entry, through slide interactions, to personalization settings, thereby offering a robust and accessible user experience.

According to an exemplary aspect of the present disclosure, the processor executes instructions from the real-time audio and text narration engine through a special purpose audio effects module, the special purpose audio effects module comprising an audio processor and a sound library stored in the computing and/or communication device, configured to generate ambient sounds and special audio effects to enhance the narration.

According to an exemplary aspect of the present disclosure, the processor executes instructions from the real-time audio and text narration engine through a customizable user settings module, the customizable user settings module comprising a preference manager component configured to manage user-specific settings, including language, narration speed, and volume levels.

According to an exemplary aspect of the present disclosure, the processor executes instructions from the real-time audio and text narration engine through the customizable user settings module, the customizable user settings module comprising a language selector component configured to enable users to choose the language in which they wish to receive the audio and text narration.

According to an exemplary aspect of the present disclosure, the processor executes instructions from the real-time audio and text narration engine through the customizable user settings module, the customizable user settings module comprising a speed and volume control component configured to enable users to adjust the speed of the audio narration and the volume to match the users' listening capabilities and to suit the ambient noise conditions.

According to an exemplary aspect of the present disclosure, the processor executes instructions from the real-time audio and text narration engine through a real-time feedback module, the real-time feedback module comprising a feedback collector component configured to collect user feedback in various forms, including likes, dislikes, comments, and other user interactions during the presentation.

According to an exemplary aspect of the present disclosure, the processor executes instructions from the real-time audio and text narration engine through the real-time feedback module, the real-time feedback module comprising a feedback analysis component configured to work in conjunction with a feedback collector component to analyze collected data for understanding the effectiveness of the presenter's presentation.

According to an exemplary aspect of the present disclosure, wherein the processor executes instructions from the real-time audio and text narration engine through the presenter-side script and control module, the presenter-side script and control module comprising a presenter interface component configured to enable the presenter to manage various aspects of the presentation, including slide navigation, activation of specific narration, audio effects, and other customizable controls during the presentation.

According to an exemplary aspect of the present disclosure, the processor executes instructions from the real-time audio and text narration engine through the presenter-side script and control module, the presenter-side script and control module comprising a timing manager component configured to coordinate the timing aspects of the presentation, including synchronizing the audio and text narration with the slide transitions, providing countdowns, and triggering specific actions based on preset times and conditions.

According to an exemplary aspect of the present disclosure, the processor executes instructions from the real-time audio and text narration engine through the presenter-side script and control module, the presenter-side script and control module comprising a narration trigger component configured to initiate the real-time audio and text narration based on cues from the timing manager component and direct input from the presenter interface component.

According to an exemplary aspect of the present disclosure, the processor executes instructions from the real-time audio and text narration engine through a voiceover and special effect integration module, the voiceover and special effect integration module comprising a text-to-voice converter component configured to convert written text into spoken words.

According to an exemplary aspect of the present disclosure, the processor executes instructions from the real-time audio and text narration engine through the voiceover and special effect integration module, the voiceover and special effect integration module comprising an effect integration component configured to incorporate various special audio effects into the presentation to enhance the overall presentation experience.

According to an exemplary aspect of the present disclosure, the processor executes instructions from the real-time audio and text narration engine through a user interface module, the user interface module comprising a navigation component configured to enable users to navigate through various functionalities.

According to an exemplary aspect of the present disclosure, the processor executes instructions from the real-time audio and text narration engine through the user interface module, the user interface module comprising a display component configured to manage the visualization of the presentation and related information.

According to an exemplary aspect of the present disclosure, the server executes instructions from the real-time audio and text narration engine through an adaptive real-time response module, the adaptive real-time response module comprising a content monitoring component configured to continuously observe the presentation content in real-time, including tracking the slides being displayed, the pace of the presentation, and the audio and text narratives.

According to an exemplary aspect of the present disclosure, the server executes instructions from the real-time audio and text narration engine through the adaptive real-time response module, the adaptive real-time response module comprising a context analysis component configured to analyze the context of the presentation, including understanding audience demographics, the importance of particular slides and sections, and the mood of the presenter.

According to an exemplary aspect of the present disclosure, the processor executes instructions from the real-time audio and text narration engine through a special purpose audio effects module, the special purpose audio effects module comprising an effect generator component configured to incorporate various special audio effects into the presentation to enhance the overall presentation experience.

According to an exemplary aspect of the present disclosure, the processor executes instructions from the real-time audio and text narration engine through a user interface module, the user interface module comprising a settings interface component configured to enable users to personalize their experience by selecting preferred language, narration speed, and volume.

According to an exemplary aspect of the present disclosure, the server executes instructions from the real-time audio and text narration engine through an adaptive real-time response module, the adaptive real-time response module comprising a real-time update component configured to implement changes suggested by the context analysis component.

According to an exemplary aspect of the present disclosure, the server executes instructions from the real-time audio and text narration engine through a slide summary and description module, the slide summary and description module comprising a content scanning component configured to analyze text, images, graphics, and other multimedia elements present on the slide.

According to an exemplary aspect of the present disclosure, the server executes instructions from the real-time audio and text narration engine through a slide summary and description module, the slide summary and description module comprising a summary creation component configured to create concise summaries of the slide content.

According to an exemplary aspect of the present disclosure, the server executes instructions from the real-time audio and text narration engine through a slide summary and description module, the slide summary and description module comprising a description creation component configured to generate detailed descriptions of the slide content.

According to an exemplary aspect of the present disclosure, the server executes instructions through a multi-platform integration module, the multi-platform integration module comprising an API connector component configured to handle interactions between the multi-platform integration module and other systems using Application Programming Interfaces (APIs).

According to an exemplary aspect of the present disclosure, the processor executes instructions from the real-time audio and text narration engine through the voiceover and special effect integration module, the voiceover and special effect integration module comprising a multimedia output component configured to combine the audio narration generated by the text-to-voice converter and any special audio effects for playback.

According to an exemplary aspect of the present disclosure, the server executes instructions through the multi-platform integration module, the multi-platform integration module comprising a data mapping component configured to map the data and functionalities from the system onto the platform it is integrated with.

According to an exemplary aspect of the present disclosure, the server executes instructions through a communication and API module, the communication and API module comprising a data send/receive component configured to manage the transmission of data to and from the client-side computing and/or communication device and the server.

According to an exemplary aspect of the present disclosure, the server executes instructions through the communication and API module, the communication and API module comprising an API management component configured to handle interactions with third-party services or platforms through APIs.

According to an exemplary aspect of the present disclosure, the server executes instructions through the communication and API module, the communication and API module comprising a data synchronization component configured to ensure that all data across the system is up-to-date and consistent.

According to an exemplary aspect of the present disclosure, the server executes instructions through a data storage and retrieval module, the data storage and retrieval module comprising a user data storage component configured to securely store user-specific data including settings, preferences, and profiles.

According to an exemplary aspect of the present disclosure, the server executes instructions through the data storage and retrieval module, the data storage and retrieval module comprising a multimedia data storage component configured to store multimedia content including audio files, text narrations, and presentation slides.

According to an exemplary aspect of the present disclosure, the server executes instructions through the data storage and retrieval module, the data storage and retrieval module comprising a data retrieval component configured to fetch stored data upon request for use by the system and users.

According to an exemplary aspect of the present disclosure, enabling a presenter to initiate and manage various aspects of the presentation on a computing and/or communication device using a presenter-side script and control module;

According to an exemplary aspect of the present disclosure, actively listening to the presenter's speech using a real-time audio and text narration engine to detect specific cues and markers embedded within the presenter's presentation content using natural language processing algorithms.

According to an exemplary aspect of the present disclosure, initiating dynamic responses for changing slides and providing additional information upon detecting the cues and markers within the presenter's presentation content using the real-time audio and text narration engine.

According to an exemplary aspect of the present disclosure, selecting and delivering appropriate images, audio playback, and text file descriptions in real-time upon detecting the cues and markers within the presenter's presentation content;

According to an exemplary aspect of the present disclosure, presenting the selected images on a user interface of the computing and/or communication device and transmitting the audio playback and text file descriptions to the computing and/or communication device to enhance accessibility for users, including visually impaired members.

According to an exemplary aspect of the present disclosure, allowing users to personalize various aspects of the presentation using a customizable user settings module in the real-time audio and text narration engine.

According to an exemplary aspect of the present disclosure, collecting and analyzing user feedback in real-time using a real-time feedback module in the real-time audio and text narration engine.

According to an exemplary aspect of the present disclosure, continuously monitoring the presenter's presentation content for additional cues and markers by tracking the slides being displayed using an adaptive real-time response module enabled in the server.

According to an exemplary aspect of the present disclosure, monitoring user interactions and feedback, and analyzing the context of the presentation, the importance of particular slides, and the mood of the presenter using the adaptive real-time response module.

According to an exemplary aspect of the present disclosure, altering the speed of the narration, modifying the sequence of slides, and integrating real-time feedback using the adaptive real-time response module.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Although the present disclosure has been described in terms of certain preferred embodiments and illustrations thereof, other embodiments and modifications to preferred embodiments may be possible that are within the principles and spirit of the invention. The above descriptions and figures are therefore to be regarded as illustrative and not restrictive.

Thus the scope of the present disclosure is defined by the appended claims and includes both combinations and sub-combinations of the various features described hereinabove as well as variations and modifications thereof, which would occur to persons skilled in the art upon reading the foregoing description.

What is claimed is:

1. A system for enhancing presentation accessibility through real-time audio and text narration, comprising:

a computing and/or communication device comprises a display unit for showing a presentation content, and a processor for executing instructions from a real-time audio and text narration engine located within the computing and/or communication device, wherein the real-time audio and text narration engine comprises:

a presenter-side script and control module configured to enable a presenter to initiate a presentation and control slide transitions, whereby the real-time audio and text narration engine actively listens to the presenter's speech to detect specific cues and markers embedded within the presentation content using natural language processing algorithms, whereby the real-time audio and text narration engine initiates dynamic responses for changing slides, and selects and delivers appropriate images, audio playback, and text file descriptions in real-time, generating audio playback with an into-sound indicator, an AI voice reading description, and sound effects related to a slide, generating text file descriptions with a voiceover accessibility feature and special effect audio playing simultaneously to enhance user experience, presenting selected images on a user interface of the computing and/or communication device, and transmitting audio playback and text file descriptions to the computing and/or communication device to enhance accessibility for users, including visually impaired members; and a server communicatively coupled to the computing and/or communication device via the network, wherein the server comprises:

a receiver module configured to receive the presentation content from the computing and/or communication device, a processing module configured to generate real-time audio and text narration from the presentation content, the processing module comprising:

an adaptive real-time response module configured to monitor the presenter's presentation content for cues and markers by tracking the slides being displayed, the adaptive real-time response module further configured to monitor users' interactions and feedback, analyze the context of the presentation, and assess the importance of slides and the presenter's mood, whereby the adaptive real-time response module makes real-time adjustments, alters the speed of the narration, modifies the sequence of slides, and integrates feedback, thereby providing synchronized real-time audio and text narration that enhances presentation accessibility for users.

2. The system of claim 1, wherein the processor executes instructions from the real-time audio and text narration engine through a special purpose audio effects module, the special purpose audio effects module comprising an audio processor and a sound library stored in the computing and/or communication device, configured to generate ambient sounds and special audio effects to enhance the narration.

3. The system of claim 1, wherein the processor executes instructions from the real-time audio and text narration engine through a customizable user settings module, the customizable user settings module comprising a preference manager component configured to manage user-specific settings, including language, narration speed, and volume levels.

4. The system of claim 1, wherein the processor executes instructions from the real-time audio and text narration engine through the customizable user settings module, the customizable user settings module comprising a language selector component configured to enable users to choose the language in which they wish to receive the audio and text narration.

5. The system of claim 1, wherein the processor executes instructions from the real-time audio and text narration engine through the customizable user settings module, the customizable user settings module comprising a speed and volume control component configured to enable users to adjust the speed of the audio narration and the volume to match the users' listening capabilities and to suit the ambient noise conditions.

6. The system of claim 1, wherein the processor executes instructions from the real-time audio and text narration engine through a real-time feedback module, the real-time feedback module comprising a feedback collector component configured to collect user feedback in various forms, including likes, dislikes, comments, and other user interactions during the presentation.

7. The system of claim 1, wherein the processor executes instructions from the real-time audio and text narration engine through the real-time feedback module, the real-time feedback module comprising a feedback analysis component configured to work in conjunction with a feedback collector component to analyze collected data for understanding the effectiveness of the presenter's presentation.

8. The system of claim 1, wherein the processor executes instructions from the real-time audio and text narration engine through the presenter-side script and control module, the presenter-side script and control module comprising a presenter interface component configured to enable the presenter to manage various aspects of the presentation, including slide navigation, activation of specific narration, audio effects, and other customizable controls during the presentation.

9. The system of claim 1, wherein the processor executes instructions from the real-time audio and text narration engine through the presenter-side script and control module, the presenter-side script and control module comprising a timing manager component configured to coordinate the timing aspects of the presentation, including synchronizing the audio and text narration with the slide transitions, providing countdowns, and triggering specific actions based on preset times and conditions.

10. The system of claim 1, wherein the processor executes instructions from the real-time audio and text narration engine through the presenter-side script and control module, the presenter-side script and control module comprising a narration trigger component configured to initiate the real-time audio and text narration based on cues from the timing manager component and direct input from the presenter interface component.

11. The system of claim 1, wherein the processor executes instructions from the real-time audio and text narration engine through a voiceover and special effect integration module, the voiceover and special effect integration module comprising a text-to-voice converter component configured to convert written text into spoken words.

12. The system of claim 1, wherein the processor executes instructions from the real-time audio and text narration engine through the voiceover and special effect integration module, the voiceover and special effect integration module comprising an effect integration component configured to incorporate various special audio effects into the presentation to enhance the overall presentation experience.

13. The system of claim 1, wherein the processor executes instructions from the real-time audio and text narration engine through a user interface module, the user interface module comprising a navigation component configured to enable users to navigate through various functionalities.

14. The system of claim 1, wherein the processor executes instructions from the real-time audio and text narration engine through the user interface module, the user interface module comprising a display component configured to manage the visualization of the presentation and related information.

15. The system of claim 1, wherein the server executes instructions from the real-time audio and text narration engine through an adaptive real-time response module, the adaptive real-time response module comprising a content monitoring component configured to continuously observe the presentation content in real-time, including tracking the slides being displayed, the pace of the presentation, and the audio and text narratives.

16. The system of claim 1, wherein the server executes instructions from the real-time audio and text narration engine through the adaptive real-time response module, the adaptive real-time response module comprising a context analysis component configured to analyze the context of the presentation, including understanding audience demographics, the importance of particular slides and sections, and the mood of the presenter.

17. The system of claim 1, wherein the processor executes instructions from the real-time audio and text narration engine through a special purpose audio effects module, the special purpose audio effects module comprising an effect generator component configured to incorporate various special audio effects into the presentation to enhance the overall presentation experience.

18. The system of claim 1, wherein the processor executes instructions from the real-time audio and text narration engine through the user interface module, the user interface module comprising a settings interface component configured to enable users to personalize their experience by selecting preferred language, narration speed, and volume.

19. The system of claim 1, wherein the server executes instructions from the real-time audio and text narration engine through an adaptive real-time response module, the adaptive real-time response module comprising a real-time update component configured to implement changes suggested by the context analysis component.

20. The system of claim 1, wherein the server executes instructions from the real-time audio and text narration engine through a slide summary and description module, the slide summary and description module comprising a content scanning component configured to analyze text, images, graphics, and other multimedia elements present on the slide.

21. The system of claim 1, wherein the server executes instructions from the real-time audio and text narration engine through the slide summary and description module, the slide summary and description module comprising a summary creation component configured to create concise summaries of the slide content.

22. The system of claim 1, wherein the server executes instructions from the real-time audio and text narration engine through the slide summary and description module, the slide summary and description module comprising a description creation component configured to generate detailed descriptions of the slide content.

23. The system of claim 1, wherein the server executes instructions through a multi-platform integration module, the multi-platform integration module comprising an API connector component configured to handle interactions between the multi-platform integration module and other systems using Application Programming Interfaces (APIs).

24. The system of claim 1, wherein the processor executes instructions from the real-time audio and text narration engine through the voiceover and special effect integration module, the voiceover and special effect integration module comprising a multimedia output component configured to combine the audio narration generated by the text-to-voice converter and any special audio effects for playback.

25. The system of claim 1, wherein the server executes instructions through the multi-platform integration module, the multi-platform integration module comprising a data mapping component configured to map the data and functionalities from the system onto the platform it is integrated with.

26. The system of claim 1, wherein the server executes instructions through a communication and API module, the communication and API module comprising a data send/receive component configured to manage the transmission of data to and from the client-side computing and/or communication device and the server.

27. The system of claim 1, wherein the server executes instructions through the communication and API module, the communication and API module comprising an API management component configured to handle interactions with third-party services or platforms through APIs.

28. The system of claim 1, wherein the server executes instructions through the communication and API module, the communication and API module comprising a data synchronization component configured to ensure that all data across the system is up-to-date and consistent.

29. The system of claim 1, wherein the server executes instructions through a data storage and retrieval module, the data storage and retrieval module comprising a user data storage component configured to securely store user-specific data including settings, preferences, and profiles.

30. The system of claim 1, wherein the server executes instructions through the data storage and retrieval module, the data storage and retrieval module comprising a multimedia data storage component configured to store multimedia content including audio files, text narrations, and presentation slides.

31. The system of claim 1, wherein the server executes instructions through the data storage and retrieval module, the data storage and retrieval module comprising a data retrieval component configured to fetch stored data upon request for use by the system and users.

32. A method for enhancing presentation accessibility through real-time audio and text narration, comprising:

enabling a presenter to initiate and manage various aspects of the presentation on a computing and/or communication device using a presenter-side script and control module;

actively listening to the presenter's speech using a real-time audio and text narration engine to detect specific cues and markers embedded within the presenter's presentation content using natural language processing algorithms;

initiating dynamic responses for changing slides and providing additional information upon detecting the cues and markers within the presenter's presentation content using the real-time audio and text narration engine;

selecting and delivering appropriate images, audio playback, and text file descriptions in real-time upon detecting the cues and markers within the presenter's presentation content;

presenting the selected images on a user interface of the computing and/or communication device and transmitting the audio playback and text file descriptions to the computing and/or communication device to enhance accessibility for users, including visually impaired members;

allowing users to personalize various aspects of the presentation using a customizable user settings module in the real-time audio and text narration engine;

collecting and analyzing user feedback in real-time using a real-time feedback module in the real-time audio and text narration engine;

continuously monitoring the presenter's presentation content for additional cues and markers by tracking the slides being displayed using an adaptive real-time response module enabled in the server;

monitoring user interactions and feedback, and analyzing the context of the presentation, the importance of particular slides, and the mood of the presenter using the adaptive real-time response module; and altering the speed of the narration, modifying the sequence of slides, and integrating real-time feedback using the adaptive real-time response module.

33. A computer program product comprising a non-transitory computer-readable medium having a computer-readable program code embodied therein to be executed by one or more processors, said program code including instructions to:

enable a presenter to initiate and manage various aspects of the presentation on a computing and/or communication device using a presenter-side script and control module;

actively listen to the presenter's speech using a real-time audio and text narration engine to detect specific cues and markers embedded within the presenter's presentation content using natural language processing algorithms;

initiate dynamic responses for changing slides and providing additional information upon detecting the cues and markers within the presenter's presentation content using the real-time audio and text narration engine;

select and deliver appropriate images, audio playback, and text file descriptions in real-time upon detecting the cues and markers within the presenter's presentation content;

present the selected images on a user interface of the computing and/or communication device and transmit the audio playback and text file descriptions to the computing and/or communication device to enhance accessibility for users, including visually impaired members;

allow users to personalize various aspects of the presentation using a customizable user settings module in the real-time audio and text narration engine;

collect and analyze user feedback in real-time using a real-time feedback module in the real-time audio and text narration engine;

continuously monitor the presenter's presentation content for additional cues and markers by tracking the slides being displayed using an adaptive real-time response module enabled in the server;

monitor user interactions and feedback, and analyze the context of the presentation, the importance of particular slides, and the mood of the presenter using the adaptive real-time response module; and alter the speed of the narration, modify the sequence of slides, and integrate real-time feedback using the adaptive real-time response module.

* * * * *